(12) United States Patent
Upshaw et al.

(10) Patent No.: US 8,389,608 B2
(45) Date of Patent: Mar. 5, 2013

(54) AMINOPLAST-POLYTHIOL COMPOSITIONS AND ARTICLES PRODUCED THEREFROM

(75) Inventors: Thomas A. Upshaw, Owasso, OK (US); Chad W. Brown, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 145 days.

(21) Appl. No.: 12/878,124

(22) Filed: Sep. 9, 2010

(65) Prior Publication Data
US 2012/0064322 A1 Mar. 15, 2012

(51) Int. Cl.
*C08K 5/1515* (2006.01)
*C08K 5/103* (2006.01)
*C08K 5/36* (2006.01)
*B05D 3/10* (2006.01)
*B32B 21/08* (2006.01)
*B32B 27/10* (2006.01)
*B32B 15/08* (2006.01)
*C08G 73/02* (2006.01)

(52) U.S. Cl. ........ 524/114; 524/306; 524/311; 428/220; 428/385; 428/457; 428/537.1; 428/537.5; 525/417

(58) Field of Classification Search .................. 524/114, 524/306, 311; 428/220, 385, 457, 537.1, 428/537.5; 525/417
See application file for complete search history.

(56) References Cited

U.S. PATENT DOCUMENTS

| | | | |
|---|---|---|---|
| 3,141,885 A | 7/1964 | Ross et al. | |
| 3,874,848 A | 4/1975 | Massy et al. | |
| 3,920,600 A * | 11/1975 | Ahramjian | 524/512 |
| 4,089,827 A | 5/1978 | Massy et al. | |
| 4,291,162 A | 9/1981 | Massy | |
| 4,369,283 A | 1/1983 | Altschuler | |
| 5,356,669 A | 10/1994 | Rehfuss | |
| 5,777,048 A | 7/1998 | Ohrbom | |
| 7,034,086 B2 | 4/2006 | Lin et al. | |
| 7,279,448 B2 | 10/2007 | Erhan | |
| 7,557,236 B2 | 7/2009 | Brown et al. | |
| 7,585,932 B2 | 9/2009 | Byers et al. | |
| 7,713,326 B2 | 5/2010 | Carstens et al. | |
| 7,781,484 B2 | 8/2010 | Byers et al. | |
| 7,910,666 B2 | 3/2011 | Byers et al. | |
| 2004/0249088 A1 | 12/2004 | Hees et al. | |
| 2005/0197390 A1 | 9/2005 | Byers et al. | |
| 2005/0197391 A1 | 9/2005 | Refvik et al. | |
| 2006/0000252 A1 | 1/2006 | Carstens et al. | |
| 2006/0036110 A1 | 2/2006 | Brown et al. | |
| 2006/0111520 A1 | 5/2006 | Byers et al. | |
| 2007/0055033 A1 | 3/2007 | Byers et al. | |
| 2007/0112100 A1 | 5/2007 | Byers et al. | |
| 2008/0214774 A1 | 9/2008 | Brown et al. | |
| 2009/0124762 A1 | 5/2009 | Brown et al. | |
| 2009/0124784 A1 | 5/2009 | Brown et al. | |
| 2009/0186988 A1 | 7/2009 | Anderson et al. | |

FOREIGN PATENT DOCUMENTS

| | | |
|---|---|---|
| BE | 627599 | 6/1963 |
| BE | 633302 | 6/1963 |
| EP | 0005281 | 11/1979 |
| EP | 0041039 | 12/1981 |
| GB | 1019338 | 2/1966 |
| GB | 1033902 | 6/1966 |
| GB | 1231787 | 5/1971 |
| JP | 57-029583 | 2/1982 |
| JP | 2-247235 | 10/1990 |
| JP | 3-079648 | 4/1991 |

OTHER PUBLICATIONS

International Search Report, PCT/US2011/050638, dated Dec. 15, 2011.
Kirk-Othmer Encyclopedia of Chemical Technology, "Melamine Resins," a John Wiley & Sons, Inc., Publication, 2005, 5$^{th}$ Edition, vol. 15, pp. 773-796.
CYCAT 4040 catalyst, Cytec Industries Inc., 1999, CRT-735-EU, 2 pages.
CYMEL 1123 resin, Cytec Industries Inc., 1999, CRT-723-A-EU, 2 pages.
CYMEL 1170 resin, Cytec Industries Inc., 1999, CRT-724-EU, 2 pages.
CYMEL resins, Cytec Industries Inc., 2000, pp. 1-24.
CYMEL U-60 resin, Cytec Industries Inc., 1993, CRT-100-G, 2 pages.
CYMEL U-80 resin, Cytec Industries Inc., 2003, CRT-670-B, 8 pages.
Hexion Specialty Chemicals, "Polymac HS 57-5776 Thermosetting Polyester Resin," HCD-2291, 2007, 2 pages.
Hexion Specialty Chemicals, "High Solids Polyesters for Coatings (Americas)," http://www.hexion.com/Products/Main.aspx?id=1833&, 2007, 1 page.
"Acrylic Polyols for High Solids Coatings," Johnson Polymer, Coatings JONCRYL® Selection Guide, www.johnsonpolymer.com, 2005, 9 pages.
Maprenal Resimene, "Sales range of Melamine and Benzoguanamine formaldehyde resins according to structure," INEOS Melamines, www.ineosmelamines.com, 2007, 6 pages.
Wicks, "Amino Resins," Chapter 11, Organic Coatings: Science and Technology, 3$^{rd}$ Edition, 2007, pp. 213-230.
"Resimene Amino Crosslinking Resins," Surface Specialties Melamines, pp. 1-44.
Schoenenberger, "Cytostatics. 23. Tumor-inhibiting effect . . . ," Archiv der Pharmazie, 1973, vol. 306, 4, pp. 274-284.
Schoenenberger, "Chemistry and mode of action of aminomethylating carcinostatics. II. Cytostatics," Arzneimittel-Forschung, 1965, vol. 15, 1, pp. 30-36.
Peter, "Pharmacological study of the active substances of *Ginkgo biloba*," Arzneimittel-Forschung, 1966, vol. 16, 6, pp. 719-725.
Schoenenberger, "The action of aminomethylating carcinostatics on experimental tumors," Arzneimittel-Forschung, 1966, vol. 16, 6, pp. 734-738.

\* cited by examiner

*Primary Examiner* — Kriellion Sanders
(74) *Attorney, Agent, or Firm* — Merchant & Gould P.C.

(57) ABSTRACT

Aminoplast-polythiol compositions resulting from the contact product, or cured reaction product, of an aminoplast resin composition and a polythiol composition are disclosed. Typically, the polythiol composition contains thiol ester molecules having an average of two or more thiol groups per molecule. Methods for preparing the aminoplast-polythiol compositions, methods for using the aminoplast-polythiol compositions to produce coatings and to coat substrates, and coatings and other articles produced using these aminoplast-polythiol compositions also are described.

31 Claims, No Drawings

US 8,389,608 B2

AMINOPLAST-POLYTHIOL COMPOSITIONS AND ARTICLES PRODUCED THEREFROM

BACKGROUND OF THE INVENTION

Aminoplast resin compositions can be used to produce articles, such as coatings and adhesives, for a variety of end-use applications. Often, these aminoplast resin compositions are reacted and crosslinked with nucleophilic compounds, including alcohols, carboxylic acids, and amines, among others.

In the present invention, aminoplast resin compositions are contacted and/or reacted with polythiol compositions. These polythiol compositions generally comprise thiol ester molecules having an average of two or more thiol groups per molecule. Coatings and other articles produced from the aminoplast-polythiol compositions can offer improvements in weatherability, chemical resistance, impact strength, flexibility, hardness development, gloss, and/or cure time as compared conventional aminoplast-crosslinker formulations.

SUMMARY OF THE INVENTION

The present invention relates to aminoplast-polythiol compositions, methods for preparing the compositions, methods for using the compositions to coat substrates, and coatings and other articles produced from the compositions. In accordance with the present invention, an aminoplast-polythiol composition can comprise a contact product of:

a) an aminoplast resin composition; and
b) a polythiol composition comprising thiol ester molecules having an average of two or more thiol groups per molecule.

In another aspect, an aminoplast-polythiol composition can comprise a cured reaction product of:

a) an aminoplast resin composition; and
b) a polythiol composition comprising thiol ester molecules having an average of two or more thiol groups per molecule.

In yet another aspect, a coating is provided, and this coating comprises a cured reaction product of:

a) an aminoplast resin composition; and
b) a polythiol composition comprising thiol ester molecules having an average of two or more thiol groups per molecule.

Aminoplast resin compositions, as discussed in greater detail below, can comprise an aminoplast resin derived from a polyamine or polyamide compound (e.g., melamine, benzoguanamine, urea, glycoluril, etc.), and these compositions can include a methylated melamine-formaldehyde resin, a methylated-butylated melamine-formaldehyde resin, a methylated-ethylated benzoguanamine-formaldehyde resin, a butylated glycoluril-formaldehyde resin, a methylated urea-formaldehyde resin, a butylated urea-formaldehyde resin, and the like, or combinations thereof.

Polythiol compositions, as discussed in greater detail below, can comprise thiol ester molecules having an average of two or more thiol groups per molecule, and such compositions can comprise:

a) a thiol ester composition comprising thiol ester molecules derived from an unsaturated ester, from an unsaturated natural source oil, and/or from an unsaturated triglyceride;
b) a hydroxy thiol ester composition comprising hydroxy thiol ester molecules derived from an epoxidized unsaturated ester, from an epoxidized unsaturated natural source oil, and/or from an epoxidized unsaturated triglyceride;
c) a crosslinked thiol ester composition comprising crosslinked thiol ester oligomers having at least three thiol ester monomers derived from an unsaturated ester, from an epoxidized unsaturated ester, from an unsaturated natural source oil, from an epoxidized unsaturated natural source oil, from an unsaturated triglyceride, and/or from an epoxidized unsaturated triglyceride, and connected by polysulfide linkages having the structure —$S_Q$—, wherein Q is an integer greater than 1; or
d) any combination thereof.

The above summary of the invention is not intended to describe each disclosed embodiment or every aspect of the present invention. The detailed description that follows more particularly exemplifies the disclosed aspects and embodiments, but does not limit the scope of the invention, as defined in part by the claims that follow.

Definitions

To define more clearly the terms used herein, the following definitions are provided. To the extent that any definition or usage provided by any document incorporated herein by reference conflicts with the definition or usage provided herein, the definition or usage provided herein controls.

In this application, "hydrocarbyl group" is used in accordance with the definition specified by IUPAC: a univalent group formed by removing a hydrogen atom from a hydrocarbon (i.e., a group containing only carbon and hydrogen). Similarly, a "hydrocarbylene group" refers to a group formed by removing two hydrogen atoms from a hydrocarbon. A "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be aliphatic, inclusive of acyclic and cyclic groups, or aromatic. A "hydrocarbyl group," "hydrocarbylene group," and "hydrocarbon group" can include rings, ring systems, aromatic rings, and aromatic ring systems which contain only carbon and hydrogen. Hydrocarbyl groups, hydrocarbylene groups, and hydrocarbon groups include, by way of example, aryl, arylene, alkyl, alkylene, cycloalkyl, cycloalkylene, aralkyl, aralkylene, and combinations of these groups, among others. Hydrocarbyl groups, hydrocarbylene groups, and hydrocarbon groups can be linear or branched, unless otherwise specified.

For purposes of this application, an "organyl group" has the definition specified by IUPAC: an organic substituent group, regardless of functional type, having one free valence at a carbon atom. Similarly, an "organylene group" refers to an organic group, regardless of functional type, formed by removing two hydrogen atoms from one or two carbon atoms of an organic compound, and an "organic group" refers to a generalized organic group formed by removing one or more hydrogen atoms from one or more carbon atoms of an organic compound. Thus, an "organyl group," an "organylene group," and an "organic group" can contain organic functional group(s) and/or atom(s) other than carbon and hydrogen (i.e., an organic group that can comprise functional groups and/or atoms in addition to carbon and hydrogen). For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, and phosphines, and so forth. An "organyl group," "organylene group," or "organic group" can be aliphatic, inclusive of acyclic and cyclic groups, or aromatic. Organyl groups, organylene groups, and organic groups also encompass heteroatom-containing rings, heteroatom-containing ring systems, heteroaromatic rings, and heteroaromatic ring systems (e.g., pyrroles, pyrrolidines, pyridines, furans, diazines, triazines, triazoles, etc.). Finally, it should be noted that the "organyl group," "organylene group," or "organic group" definitions include the hydrocarbyl group, hydrocarbylene group, and hydrocarbon group, respectively, as members. Organyl groups, organylene groups, and organic groups can be linear or branched, unless otherwise specified.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include a reaction product, it is not required for the respective components to react with one another Likewise, "contacting" two or more components can result in a reaction product or a reaction mixture. Consequently, depending upon the circumstances, a "contact product" can be a mixture, a reaction mixture, or a reaction product. Also, in this application, "reaction product" and "cured reaction product" will be used interchangeably, and refer to materials that have reacted and/or cured to form at least a partially crosslinked composition, generally from 35% to 100%, or from 50% to 100%, of complete crosslinking.

The term "substrate" includes any material having a surface that is capable of being coated with the compositions or formulations of this invention. The substrate can comprise one or more materials (e.g., metal, wood, etc.). Additionally, the substrate can have a smooth or a rough surface; can have cracks, voids, or defects; and/or can be porous or non-porous.

The terms "a," "an," and "the" are intended to include plural alternatives, e.g., at least one. For instance, the disclosure of "an unsaturated natural source oil," "a solvent," "a polyamine compound," etc., is meant to encompass one, or mixtures or combinations of more than one, unsaturated natural source oil, solvent, polyamine compound, etc., unless otherwise specified.

Although any methods and materials similar or equivalent to those described herein can be used in the practice or testing of the invention, the typical methods and materials are herein described. Various embodiments and aspects of the invention are disclosed, and these various embodiments and aspects can be combined in any fashion, even if not specifically described, and such combinations are still within the scope of this invention.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any general or specific compound or structure disclosed herein, the structure or compound presented also encompasses all conformational isomers, regioisomers, and stereoisomers that can arise from a particular set of substituents, unless otherwise specified. The structure also encompasses all enantiomers, diastereomers, and other optical isomers whether in enantiomeric or racemic forms, as well as mixtures of stereoisomers, as would be recognized by a skilled artisan, unless otherwise specified.

Applicants disclose several types of ranges in the present invention. These include, but are not limited to, a range of number of atoms, a range of number of functional groups per molecule, a range of molecular weights, a range of molar ratios, a range of mole percents, a range of weight percents, a range of temperatures, a range of reaction/cure times, a range of thicknesses, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a hydrocarbyl group having from 1 to 20 carbon atoms (i.e., a $C_1$-$C_{20}$ hydrocarbyl group), as used herein, refers to a moiety that can be selected independently from a hydrocarbyl group having 1, 2, 3, 4, 5, 6, 7, 8, 9, 10, 11, 12, 13, 14, 15, 16, 17, 18, 19, or 20 carbon atoms, as well as any range between these two numbers (for example, a hydrocarbyl group having 3 to 12 carbon atoms), and also including any combination of ranges between these two numbers (for example, a hydrocarbyl group having 1 to 4 carbon atoms and a hydrocarbyl group having 8 to 12 carbon atoms).

Similarly, another representative example follows for the average weight percent of thiol sulfur per thiol ester molecule provided in one aspect of this invention. By a disclosure that thiol ester molecules have an average weight percent of thiol sulfur per thiol ester molecule in a range from 5 to 25 weight percent, Applicants intend to recite that the weight percent can be 5, about 6, about 7, about 8, about 9, about 10, about 11, about 12, about 13, about 14, about 15, about 16, about 17, about 18, about 19, about 20, about 21, about 22, about 23, about 24, or 25 weight percent. Additionally, the weight percent can be within any range from 5 to 25 weight percent (for example, the weight percent is in a range from 6 to 16), and this also includes any combination of ranges between 5 and 25 weight percent. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

While compositions and methods are described in terms of "comprising" various components or steps, the compositions and methods can also "consist essentially of" or "consist of" the various components or steps.

DETAILED DESCRIPTION OF THE INVENTION

Aminoplast-polythiol compositions are described in the present invention. Additionally, methods for preparing aminoplast-polythiol compositions, methods for using aminoplast-polythiol compositions to coat substrates, and coatings and other articles produced from aminoplast-polythiol compositions are disclosed herein.

Polythiol Compositions

Aminoplast-polythiol compositions of the present invention, and articles formed therefrom, utilize a polythiol composition. Generally, polythiol compositions employed in this invention comprise thiol ester molecules having an average or two or more thiol groups per molecule.

Thiol Ester Composition The polythiol composition can comprise a thiol ester composition in an embodiment of the present invention. The thiol ester composition can comprise thiol ester molecules that have an average of at least 1.5 ester groups and an average of at least 1.5 thiol groups per thiol ester molecule. The thiol ester composition also can have a molar ratio of cyclic sulfide groups to thiol group of less than 1.5, as described herein.

Generally, the thiol ester composition contains molecules having at least one ester group and at least one thiol group. The thiol ester composition of this invention can be produced from any unsaturated ester, as described herein. For instance, the thiol ester composition can be derived from an unsaturated natural source oil or from an unsaturated triglyceride. In some instances, the thiol ester composition can be described as a mercaptanized unsaturated ester, wherein the unsaturated ester can be any unsaturated ester described herein. For instance, the thiol ester composition can be a mercaptanized unsaturated natural source oil or a mercaptanized unsaturated triglyceride. Because the feedstock unsaturated esters can contain multiple carbon-carbon double bonds per unsaturated ester molecule, carbon-carbon double bond reactivity and statistical probability dictate that each thiol ester molecule of the thiol ester composition produced from the unsaturated ester composition may not have the same number of thiol groups, number of unreacted carbon-carbon double bonds, number of cyclic sulfides, molar ratio of carbon-carbon double bonds to thiol groups, molar ratio of cyclic sulfides to thiol groups, and other quantities of functional groups and molar ratios disclosed herein as the feedstock unsaturated ester. Additionally, the feedstock unsaturated esters also can comprise a mixture of individual unsaturated esters having a different number of carbon-carbon double bonds and/or ester groups. Thus, many of these properties may be stated as an average number of the groups per thiol ester molecule within the thiol ester composition, or average ratio per thiol ester molecule within the thiol ester composition. In other embodiments, it is desired to control the content of thiol sulfur present in the thiol ester. Because it is difficult to ensure that the hydrogen sulfide reacts with every carbon-carbon double bond within the unsaturated ester, certain molecules of thiol ester can have more or less thiol groups than other molecules. Thus, the weight percent of thiol groups is stated as an average across all thiol ester molecules of the thiol ester composition.

The thiol ester can be derived from any unsaturated ester described herein. The thiol ester compositions can be described as comprising one or more separate or discrete functional groups of the thiol ester molecule and/or thiol ester composition. These independent functional groups can include: the number of (or average number of) ester groups per thiol ester molecule, the number of (or average number of) thiol groups per thiol ester molecule, the number of (or average number of) unreacted carbon-carbon double bonds per thiol ester molecule, the average thiol sulfur content of the thiol ester composition, the percentage (or average percentage) of sulfide linkages per thiol ester molecule, and the percentage (or average percentage) of cyclic sulfide groups per thiol ester molecule. Additionally, the thiol ester compositions can be described using individual or a combination of ratios including the ratio of double bonds to thiol groups, the ratio of cyclic sulfides to mercaptan group, and the like. As separate elements, these functional groups of the thiol composition will be described separately.

Minimally, in some embodiments, the thiol ester contains thiol ester molecules having at least one ester group and one thiol group per thiol ester molecule. As the thiol ester is prepared from unsaturated esters, the thiol ester can contain the same number of ester groups as the unsaturated esters described herein. In an embodiment, the thiol ester molecules have an average of at least 1.5 ester groups per thiol ester molecule. Alternatively, the thiol ester molecules have an average of at least 2 ester groups per thiol ester molecule, alternatively, an average of at least 2.5 ester groups per thiol ester molecule; or alternatively, an average of at least 3 ester groups per thiol ester molecule. In other embodiments, the thiol esters have an average of from 1.5 to 8 ester groups per thiol ester molecule; alternatively, an average of from 2 to 8 ester groups per thiol ester molecule; alternatively, an average of from 2.5 to 5 ester groups per thiol ester molecule; or alternatively, an average of from 3 to 4 ester groups per thiol ester molecule. In yet other embodiments, the thiol ester comprises an average of about 3 ester groups per thiol ester molecule, or alternatively, an average of about 4 ester groups per unsaturated ester molecule.

Minimally, the thiol ester comprises an average of at least one thiol group per thiol ester molecule. In an embodiment, the thiol ester molecules have an average of at least 1.5 thiol groups per thiol ester molecule; alternatively, an average of at least 2 thiol groups per thiol ester molecule; alternatively, an average of at least 2.5 thiol groups per thiol ester molecule; or alternatively, an average of at least 3 thiol groups per thiol ester molecule. In other embodiments, the thiol ester molecules have an average of from 1.5 to 9 thiol groups per thiol ester molecule; alternatively, an average of from 2 to 9 thiol groups per thiol ester molecule; alternatively, an average of from 2 to 6 thiol groups per thiol ester molecule, or alternatively, an average of from 3 to 8 thiol groups per thiol ester molecule.

In some embodiments, the thiol ester molecules can have an average of from 2 to 8 ester groups per thiol ester molecule, and an average of from 2 to 9 thiol groups per thiol ester molecule; alternatively, an average of from 2 to 7 ester groups per thiol ester molecule, and an average of from 2 to 8 thiol groups per thiol ester molecule; or alternatively, an average of from 2.5 to 5 ester groups per thiol ester molecule, and an average of from 2 to 6 thiol groups per thiol ester molecule.

In a non-limiting embodiment, the thiol ester composition comprises thiol ester molecules derived from an unsaturated ester (e.g., an unsaturated natural source oil or an unsaturated triglyceride) or the thiol ester composition can be a mercaptanized unsaturated ester (e.g., a mercaptanized unsaturated natural source oil or a mercaptanized unsaturated triglyceride). In these and other non-limiting embodiments, the thiol ester molecules can have an average of from 2 to 8 ester groups per thiol ester molecule and an average of from 2 to 9 thiol groups per thiol ester molecule; or alternatively, an average of from 2.5 to 5 ester groups per thiol ester molecule and an average of from 2 to 6 thiol groups per thiol ester molecule.

In other embodiments, the thiol ester can be described by the average amount of thiol sulfur present in thiol ester. In an embodiment, the thiol ester molecules have an average of at least 5 weight percent thiol sulfur per thiol ester molecule; alternatively, an average of at least 10 weight percent thiol sulfur per thiol ester molecule, or alternatively, an average of greater than 15 weight percent thiol sulfur per thiol ester molecule. In an embodiment, the thiol ester molecules have an average of from 5 to 25 weight percent thiol sulfur per thiol ester molecule; alternatively, an average of from 5 to 20 weight percent thiol sulfur per thiol ester molecule; alternatively, an average of from 6 to 15 weight percent thiol sulfur per thiol ester molecule; or alternatively, an average of from 8 to 10 weight percent thiol sulfur per thiol ester molecule.

Generally, the location of the thiol group of the thiol ester is not particularly important and will be dictated by the method used to produce the thiol ester. In embodiments wherein the thiol ester is produced by contacting an unsaturated ester with hydrogen sulfide, the position of the thiol group will be dictated by the position of the carbon-carbon double bond. When the carbon-carbon double bond is an internal carbon-carbon double bond, the method of producing the thiol ester will result in a secondary thiol group. However, when the double bond is located at a terminal position it is possible to choose reaction conditions to produce a thiol ester comprising either a primary thiol group or a secondary thiol group. In an embodiment, the thiol ester composition can comprise, or consist essentially of, thiol ester molecules comprising one or more secondary thiol groups.

Some methods of producing the thiol ester composition additionally can create sulfur-containing functional groups other than a thiol group. For example, in some thiol ester production methods, an introduced thiol group can react with a carbon-carbon double bond within the same unsaturated ester to produce a sulfide linkage. When the reaction is with a double bond of a second unsaturated ester, this produces a simple sulfide linkage. However, in some instances, the second carbon-carbon double bond is located in the same unsaturated ester molecule. When the thiol group reacts with a second carbon-carbon double bond within the same unsaturated ester molecule, a sulfide linkage is produced. In some instances, the carbon-carbon double bond can be within a second ester group of the unsaturated ester molecule. While in other instances, the carbon-carbon double bond can be within the same ester group of the unsaturated ester molecule.

When the thiol group reacts with the carbon-carbon double bond in a second ester group of the same unsaturated ester molecule, the cyclic sulfide would contain two ester groups contained within a ring structure. When the thiol group reacts with the carbon-carbon double bond within the same ester group, the cyclic sulfide would not contain an ester group within the ring structure. Within this specification, this second type of cyclic sulfide is referred to as a cyclic sulfide. Within this specification, the first type of cyclic sulfide is referred to as a simple sulfide. In the cyclic sulfide case, the sulfide linkage produces a cyclic sulfide functionality within a single ester group of the thiol ester. This linkage is termed a cyclic sulfide for purposes of this application. One such sulfide group that can be produced is a cyclic sulfide. The cyclic sulfide rings that can be produced include a tetrahydrothiopyran ring, a thietane ring, or a thiophane ring (tetrahydrothiophene ring).

In some embodiments, it is desirable to control the average amount of sulfur present as cyclic sulfide in the thiol ester. In an embodiment, the average amount of sulfur present as cyclic sulfide in the thiol ester molecules comprises less than 30 mole percent. Alternatively, the average amount of sulfur present as cyclic sulfide in the thiol ester molecules comprises less than 20 mole percent; alternatively, less than 10 mole percent; alternatively, less than 5 mole percent; or alternatively, less than 2 mole percent. In other embodiments, it is desired to control the molar ratio of cyclic sulfide groups to thiol groups. In an embodiment, the average molar ratio of cyclic sulfide groups to thiol group per thiol ester molecule is less than 1.5. Alternatively, the average molar ratio of cyclic sulfide groups to thiol group per thiol ester molecule is less than 1; alternatively, less than 0.5; alternatively, less than 0.25; or alternatively, less than 0.1. In some embodiments, the ratio of cyclic sulfide groups to thiol group per thiol ester ranges from 0 to 1; alternatively, the average molar ratio of cyclic sulfide groups to thiol group per thiol ester molecule ranges between 0.05 and 1; alternatively, between 0.05 and 0.75; alternatively, between 0.05 and 0.5; or alternatively, between 0.05 and 0.25.

In some instances it can desirable to have carbon-carbon double bonds present in the thiol ester composition, while in other embodiments it can be desirable to minimize the number of carbon-carbon double bonds present in the thiol ester composition. The presence of carbon-carbon double bonds present in the thiol ester can be stated as an average molar ratio of carbon-carbon double bonds to thiol-sulfur. In an embodiment, the average ratio of the remaining unreacted carbon-carbon double bond in the thiol ester composition to thiol sulfur is less than 1.5 per thiol ester molecule. Alternatively, the average ratio of carbon-carbon double bond to thiol sulfur is less than 1.2 per thiol ester molecule; alternatively, less than 1.0 per thiol ester molecule; alternatively, less than 0.75 per thiol ester molecule; alternatively, less than 0.5 per thiol ester molecule; alternatively, less than 0.2 per thiol ester molecule; or alternatively, less than 0.1 per thiol ester molecule.

In particular embodiments, the thiol ester is produced from unsaturated ester compositions. Because the feedstock unsaturated ester has particular compositions having a certain number of ester groups present, the product thiol ester composition will have about the same number of ester groups per thiol ester molecule as the feedstock unsaturated ester. Other, independent thiol ester properties described herein can be used to further describe the thiol ester composition.

In some embodiments, the thiol ester molecules are produced from unsaturated esters having an average of less than 25 weight percent of side chains having 3 contiguous methylene interrupted carbon-carbon double bonds, as described herein. In some embodiments, greater than 40 percent of the thiol containing natural source total side chains can include sulfur. In some embodiments, greater than 60 percent of the thiol ester molecule total side chains can include sulfur. In other embodiments, greater than 50, 70, or 80 percent of the thiol ester molecule total side chains can include sulfur.

The thiol ester compositions also can be described as a product produced by the process comprising contacting hydrogen sulfide and an unsaturated ester composition wherein the unsaturated ester can be any unsaturated ester described herein, and can be further limited by the process as described herein. The thiol esters derived from an unsaturated natural source oil or derived from an unsaturated triglyceride also can be described using a molecular weight or an average molecular weight of the side chains. Alternatively, the thiol ester composition can be described as a mercaptanized unsaturated ester, wherein the unsaturated ester can be any unsaturated ester described herein. The thiol esters described as a mercaptanized unsaturated natural source oil or a mercaptanized unsaturated triglyceride also can be described using a molecular weight or an average molecular weight of the side chains.

Hydroxy Thiol Ester Composition

In embodiments of the present invention, the thiol ester compositions also can contain a hydroxy group. When the thiol ester composition includes the hydroxy group, the thiol ester composition is referred to herein as a hydroxy thiol ester composition. The quantity or number of hydroxy groups present in the hydroxy thiol ester composition can be independent of the quantity of other functional groups present in the hydroxy thiol ester composition (i.e., thiol groups, ester groups, sulfides, cyclic sulfides). Additionally, the weight percent of thiol sulfur and functional group ratios (i.e., molar ratio of cyclic sulfides to thiol groups, molar ratio of epoxide groups to thiol groups, molar ratio of epoxide groups to $\alpha$-hydroxy thiol groups and other disclosed quantities of functional groups and their molar ratios to the thiol groups) are separate or discrete elements that can be used to describe the hydroxy thiol ester composition. The hydroxy thiol ester composition can be described using any combination of the separate functional groups or ratios described herein.

In an embodiment, the hydroxy thiol ester composition is produced by reacting hydrogen sulfide with any epoxidized unsaturated ester composition as described herein. For instance, the hydroxy thiol ester composition can be derived from an epoxidized unsaturated natural source oil or from an epoxidized unsaturated triglyceride. In some instances, the hydroxy thiol ester composition can be described as a mercaptanized epoxidized unsaturated ester, wherein the unsaturated ester can be any unsaturated ester described herein. For instance, the thiol ester composition can be a mercaptanized epoxidized unsaturated natural source oil or a mercaptanized epoxidized unsaturated triglyceride. Because the epoxidized unsaturated ester can contain multiple epoxide groups, epoxide group reactivity and statistical probability dictate that not all hydroxy thiol ester molecules of the hydroxy thiol ester composition can have the same number of hydroxy groups, thiol groups, $\alpha$-hydroxy thiol groups, sulfides, cyclic sulfides, molar ratio of cyclic sulfides to thiol groups, molar ratio of epoxide groups to thiol groups, molar ratio of epoxide groups to $\alpha$-hydroxy thiol groups, weight percent thiol sulfur, and other disclosed quantities of functional groups and their molar ratios as the epoxidized unsaturated ester composition. Thus, many of these properties may be stated as an average number or ratio per hydroxy thiol ester molecule. In other embodiments, it is desired to control the content of thiol sulfur present in the hydroxy thiol ester. Because it is difficult to ensure that hydrogen sulfide reacts with every epoxide group within the epoxidized unsaturated ester, certain hydroxy thiol ester molecules can have more or less thiol groups than other molecules within the hydroxy thiol ester composition. Thus, the weight percent of thiol groups can be stated as an average weight percent across all hydroxy thiol ester molecules.

As an embodiment of the present invention, the hydroxy thiol ester composition includes hydroxy thiol ester molecules that have an average of at least 1 ester group and an average of at least 1 $\alpha$-hydroxy thiol group per hydroxy thiol ester molecule. As an embodiment of the present invention, the hydroxy thiol ester composition includes hydroxy thiol ester molecules that have an average of at least 1.5 ester groups and an average of at least 1.5 $\alpha$-hydroxy thiol groups per hydroxy thiol ester molecule.

Minimally, in some embodiments, the hydroxy thiol ester comprises at least one ester, at least one thiol group, and at least one hydroxy group. Because the hydroxy thiol ester is prepared from epoxidized unsaturated esters, the hydroxy thiol ester can contain the same number of ester groups as the epoxidized unsaturated esters. In an embodiment, the hydroxy thiol ester molecules have an average of at least 1.5 ester groups per hydroxy thiol ester molecule. Alternatively, the hydroxy thiol ester molecules have an average of at least 2 ester groups per hydroxy thiol ester molecule; alternatively, an average of at least 2.5 ester groups per hydroxy thiol ester molecule; or alternatively, an average of at least 3 ester groups per hydroxy thiol ester molecule. In other embodiments, the hydroxy thiol esters have an average of from 1.5 to 8 ester groups per hydroxy thiol ester molecule; alternatively, an average of from 2 to 7 ester groups per hydroxy thiol ester molecule; alternatively, an average of from 2 to 5 ester groups per hydroxy thiol ester molecule; or alternatively, an average of from 2 to 4 ester groups per hydroxy thiol ester molecule. In yet other embodiments, the hydroxy thiol ester comprises an average of about 3 ester groups per hydroxy thiol ester molecule or, alternatively, an average of about 4 ester groups per hydroxy thiol ester molecule.

In some embodiments, the hydroxy group and the thiol group are combined in the same group, which produces the $\alpha$-hydroxy thiol group. In other embodiments, the thiol group and the hydroxy group are not in the same group. When this occurs, to produce the hydroxy thiol ester composition, the hydroxy group is added independently of the thiol group. For example, as another embodiment of the present invention, the hydroxy thiol ester composition advantageously includes hydroxy thiol ester molecules. The hydroxy thiol ester molecules have an average of at least 1.5 ester groups, an average of at least 1.5 thiol groups, and an average of at least 1.5 hydroxy groups per hydroxy thiol ester molecule.

Minimally, in some embodiments, the hydroxy thiol ester comprises at least one thiol group per hydroxy thiol ester molecule. In an embodiment, the hydroxy thiol ester molecules have an average of at least 1.5 thiol groups per hydroxy thiol ester molecule; alternatively, an average of at least 2 thiol groups per hydroxy thiol ester molecule; alternatively, an average of at least 2.5 thiol groups per hydroxy thiol ester molecule; or alternatively, an average of at least 3 thiol groups per hydroxy thiol ester molecule. In other embodiments, the hydroxy thiol ester molecules have an average of from 1.5 to 9 thiol groups per hydroxy thiol ester molecule; alternatively, an average of from 2 to 9 thiol groups per hydroxy thiol ester molecule; alternatively, an average of from 2 to 7 thiol groups per hydroxy thiol ester molecule; or alternatively, an average of from 2 to 6 thiol groups per hydroxy thiol ester molecule.

Minimally, in some embodiments, the hydroxy thiol ester composition comprises an average of at least 1 hydroxy group per hydroxy thiol ester molecule. In some embodiments, the hydroxy thiol ester composition comprises an average of at least 1.5 hydroxy groups per hydroxy thiol ester molecule; alternatively, average of at least 2 hydroxy groups per hydroxy thiol ester molecule; alternatively, an average of at least 2.5 hydroxy groups per hydroxy thiol ester molecule; or alternatively, an average of at least 3 hydroxy groups per thiol ester molecule. In other embodiments, the thiol ester composition comprises an average of from 1.5 to 9 hydroxy groups per hydroxy thiol ester molecule; alternatively, an average of from 2 to 9 hydroxy groups per hydroxy thiol ester molecule; alternatively, an average of from 2 to 7 hydroxy groups per hydroxy thiol ester molecule; or alternatively, an average of from 2 to 5 hydroxy groups per hydroxy thiol ester molecule.

In some embodiments, the hydroxy thiol ester composition comprises thiol ester molecules derived from an epoxidized unsaturated ester (e.g., an epoxidized unsaturated natural source oil or an epoxidized unsaturated triglyceride) or the hydroxy thiol ester composition can be a mercaptanized epoxidized unsaturated ester (e.g., a mercaptanized epoxidized unsaturated natural source oil or a mercaptanized epoxidized unsaturated triglyceride). In these and other embodiments, the hydroxy thiol ester molecules can have an average of from 2 to 7 ester groups per hydroxy thiol ester molecule, an average of from 2 to 9 thiol groups per thiol ester molecule, and an average of from 2 to 9 hydroxy groups per hydroxy thiol ester molecule; alternatively, an average of from 2 to 6 ester groups per hydroxy thiol ester molecule, an average of from 2 to 8 thiol groups per hydroxy thiol ester molecule, and an average of from 2 to 7 hydroxy groups per hydroxy thiol ester molecule; or alternatively, an average of from 2 to 4 ester groups per hydroxy thiol ester molecule, an average of from 2 to 6 thiol groups per hydroxy thiol ester molecule, and an average of from 2 to 5 hydroxy groups per hydroxy thiol ester molecule.

In yet other embodiments, the number of hydroxy groups can be stated as an average molar ratio of hydroxy groups to thiol groups. Minimally, in some embodiments, the molar ratio of hydroxy groups to thiol groups is at least 0.25. In some embodiments, the molar ratio of hydroxy groups to thiol groups is at least 0.5; alternatively, at least 0.75; alternatively, at least 1.0; alternatively, at least 1.25; or alternatively, at least 1.5. In other embodiments, the molar ratio of hydroxy groups to thiol groups ranges from 0.25 to 2.0; alternatively, from 0.5 to 1.5; or alternatively, from 0.75 to 1.25.

In embodiments where the hydroxy thiol esters are produced from an epoxidized unsaturated ester, the hydroxy thiol esters can be described as containing ester groups and $\alpha$-hydroxy thiol groups. The number of ester groups and the number of $\alpha$-hydroxy thiol groups are independent elements and, as such, the hydroxy thiol esters can be described as having any combination of ester groups and $\alpha$-hydroxy thiol groups described herein. Minimally, the hydroxy thiol ester comprises an average of at least 1 $\alpha$-hydroxy thiol group per hydroxy thiol ester molecule. In some embodiments, the hydroxy thiol ester composition comprises an average of at least 1.5 $\alpha$-hydroxy thiol groups per hydroxy thiol ester molecule; alternatively, an average of at least 2 $\alpha$-hydroxy thiol groups per hydroxy thiol ester molecule; alternatively, an average of at least 2.5 $\alpha$-hydroxy thiol groups per hydroxy thiol ester molecule; or alternatively, an average of at least 3 $\alpha$-hydroxy thiol groups per hydroxy thiol ester molecule. In other embodiments, the hydroxy thiol ester composition comprises an average of from 1.5 to 9 $\alpha$-hydroxy thiol groups per hydroxy thiol ester molecule; alternatively, an average of from 3 to 8 $\alpha$-hydroxy thiol groups per hydroxy thiol ester molecule; alternatively, an average of from 2 to 4 $\alpha$-hydroxy thiol groups per hydroxy thiol ester molecule; or alternatively, an average of from 4 to 8 $\alpha$-hydroxy thiol groups per hydroxy thiol ester molecule.

The hydroxy thiol esters can be produced by contacting an epoxidized ester derived from any unsaturated ester (i.e., an epoxidized unsaturated ester), as described herein. In some instances, it can desirable to have epoxide groups present in the hydroxy thiol ester composition. While in other embodiments, it can be desirable to minimize the number of epoxy groups present in the hydroxy thiol ester composition. Thus, the amount of residual epoxide groups can be another separate feature used to describe the hydroxy thiol ester composition.

The presence of epoxide groups in the hydroxy thiol ester can be described independently as an average number of epoxide groups per hydroxy thiol ester, a molar ratio of epoxide groups to thiol groups, a molar ratio of epoxide groups to $\alpha$-hydroxy thiol groups, or any combination thereof. In some embodiments, the hydroxy thiol ester molecules comprise an average of less than 2 epoxide groups per hydroxy thiol ester molecule. Alternatively, the hydroxy thiol ester comprises an average of less than 1.5 epoxide groups per hydroxy thiol ester molecule; alternatively, an average of less than 1 epoxide group per hydroxy thiol ester molecule; alternatively, an average of less than 0.75 epoxide groups per hydroxy thiol ester molecule; or alternatively, an average of less than 0.5 epoxide groups per hydroxy thiol ester molecule. In other embodiments, the molar ratio of epoxide groups to thiol groups averages less than 1.5. Alternatively, the molar ratio of epoxide groups to thiol groups averages less than 1; alternatively, averages less than 0.75; alternatively, averages less than 0.5; alternatively, averages less than 0.25; or alternatively, averages less than 0.1. In yet other embodiments, the molar ratio of epoxide groups to $\alpha$-hydroxy thiol groups averages less than 1.5. Alternatively, the molar ratio of epoxide groups to $\alpha$-hydroxy thiol groups averages less than 1; alternatively, averages less than 0.75; alternatively, averages less than 0.5; alternatively, averages less than 0.25; or alternatively, averages less than 0.1.

In some embodiments, the hydroxy thiol ester composition is substantially free of epoxide groups.

In other embodiments, the hydroxy thiol ester can be described by the average amount of thiol sulfur present in hydroxy thiol ester molecules. In an embodiment, the hydroxy thiol ester molecules have an average of at least 2.5 weight percent thiol sulfur per hydroxy thiol ester molecule; alternatively, an average of at least 5 weight percent thiol sulfur per hydroxy thiol ester molecule; alternatively, an average of at least 10 weight percent thiol sulfur per hydroxy thiol ester molecule; or alternatively, an average of greater than 15 weight percent thiol sulfur per hydroxy thiol ester molecule. In an embodiment, the hydroxy thiol ester molecules have an average of from 5 to 25 weight percent thiol sulfur per hydroxy thiol ester molecule; alternatively, an average of from 5 to 20 weight percent thiol sulfur per hydroxy thiol ester molecule; alternatively, an average of from 6 to 15 weight percent thiol sulfur per hydroxy thiol ester molecule; or alternatively, an average of from 8 to 10 weight percent thiol sulfur per hydroxy thiol ester molecule.

In some embodiments, at least 20 percent of the total side chains include the $\alpha$-hydroxy thiol group. In some embodiments, at least 20 percent of the total side chains include the $\alpha$-hydroxy thiol group. In some embodiments, at least 60 percent of the total side chains include the $\alpha$-hydroxy thiol group; alternatively, at least 70 percent of the total side chains include the $\alpha$-hydroxy thiol group. Yet in other embodiments, at least 80 percent of the total side chains include the $\alpha$-hydroxy thiol group.

In some aspects, greater than 20 percent of the hydroxy thiol ester molecule total side chains contain sulfur. In some aspects, greater than 40 percent of the hydroxy thiol ester molecule total side chains contain sulfur. In some aspects, greater than 60 percent of the hydroxy thiol ester molecule total side chains contain sulfur; alternatively, greater than 70 percent of the total side chains contain sulfur; or alternatively, greater than 80 percent of the total side chains contain sulfur.

In particular embodiments, the epoxidized unsaturated ester used in the synthesis of the hydroxy thiol ester composition is produced from an epoxidized unsaturated ester composition that includes an epoxidized natural source oil. Because the natural source oils have particular compositions regarding the number of ester groups present, the hydroxy thiol ester will have about the same number of ester groups as the feedstock natural source oil. Other independent properties that are described herein can be used to describe further the hydroxy thiol ester.

In other embodiments, the epoxidized unsaturated ester used to produce the hydroxy thiol ester is produced from synthetic (or semi-synthetic) unsaturated ester oils. Because the synthetic unsaturated ester can have particular compositions regarding the number of ester groups present, the hydroxy thiol ester would have about the same number of ester groups as the synthetic unsaturated ester. Other, independent properties of the unsaturated ester, whether the unsaturated ester includes a natural source or is a synthetic unsaturated ester, can be used to further describe the hydroxy thiol ester composition.

The hydroxy thiol ester compositions also can be described as a product produced by the process comprising contacting hydrogen sulfide and an epoxidized unsaturated ester composition, wherein the epoxidized unsaturated ester can be any epoxidized unsaturated ester described herein, and can be further limited by the process as described herein. The hydroxy thiol esters derived from an epoxidized unsaturated natural source oil or derived from an epoxidized unsaturated triglyceride can be described using an average molecular weight or an average molecular weight of the side chains. Alternatively, the hydroxy thiol ester composition can be described as a mercaptanized epoxidized unsaturated ester, wherein the epoxidized unsaturated ester can be any epoxidized unsaturated ester described herein. The hydroxy thiol esters described as a mercaptanized epoxidized unsaturated natural source oil or a mercaptanized epoxidized unsaturated triglyceride also can be described using a molecular weight or an average molecular weight of the side chains.

Cross-Linked Thiol Ester Compositions

In an aspect, the present invention can include cross-linked thiol ester compositions. Generally, the cross-linked thiol ester molecules are oligomers of thiol esters that are connected together by polysulfide linkages —$S_x$—, wherein x is an integer greater 1. As the cross-linked thiol ester is described as an oligomer of thiol esters, the thiol esters can be described as the monomer from which the cross-linked thiol esters are produced.

In an aspect, the cross-linked thiol ester composition comprises a thiol ester oligomer having at least two thiol ester monomers connected by a polysulfide linkage having a structure —$S_Q$—, wherein Q is an integer greater than 1. In an aspect, the polysulfide linkage can be the polysulfide linkage —$S_Q$—, wherein Q is 2, 3, 4, or mixtures thereof. In other embodiments, Q can be 2; alternatively, 3; or alternatively, 4.

In an aspect, the cross-linked thiol ester composition comprises a thiol ester oligomer having at least 3 thiol ester monomers connected by polysulfide linkages; alternatively, 5 thiol ester monomers connected by polysulfide linkages; alternatively, 7 thiol ester monomers connected by polysulfide linkages; or alternatively, 10 thiol ester monomers connected by polysulfide linkages. In yet other embodiments, the cross-linked thiol ester composition comprises a thiol ester oligomer having from 3 to 20 thiol ester monomers connected by polysulfide linkages; alternatively, from 5 to 15 thiol ester monomers connected by polysulfide linkages; or alternatively, from 7 to 12 thiol ester monomers connected by polysulfide linkages.

In an aspect, the crosslinked thiol ester composition comprises crosslinked thiol ester oligomers having at least three thiol ester monomers derived from an unsaturated ester or derived from an epoxidized unsaturated ester, and connected by polysulfide linkages having the structure —$S_Q$—, wherein Q is an integer greater than 1. In another aspect, the crosslinked thiol ester composition comprises crosslinked thiol ester oligomers having at least three thiol ester monomers derived from an unsaturated natural source oil or derived from an epoxidized unsaturated natural source oil, and connected by polysulfide linkages having the structure —$S_Q$—, wherein Q is an integer greater than 1. In yet another aspect, the crosslinked thiol ester composition comprises crosslinked thiol ester oligomers having at least three thiol ester monomers derived from an unsaturated triglyceride or derived from an epoxidized unsaturated triglyceride, and connected by polysulfide linkages having the structure —$S_Q$—, wherein Q is an integer greater than 1. The crosslinked thiol ester composition comprising crosslinked thiol ester oligomers can comprise at least three thiol ester monomers derived from any unsaturated ester, derived from any epoxidized unsaturated ester, derived from any unsaturated natural source oil, derived from any epoxidized unsaturated natural source oil, derived from any unsaturated triglyceride, and/or derived from any epoxidized unsaturated triglyceride described herein.

In an aspect, the crosslinked thiol ester composition comprises crosslinked thiol ester oligomers having at least three thiol esters which are mercaptanized unsaturated esters or are mercaptanized epoxidized unsaturated esters, and connected by polysulfide linkages having the structure —$S_Q$—, wherein Q is an integer greater than 1. In another aspect, the crosslinked thiol ester composition comprises crosslinked thiol ester oligomers having at least three thiol ester monomers which are mercaptanized unsaturated natural source oils or mercaptanized epoxidized unsaturated natural source oils, and connected by polysulfide linkages having the structure —$S_Q$—, wherein Q is an integer greater than 1. In yet another aspect, the crosslinked thiol ester composition comprises crosslinked thiol ester oligomers having at least three thiol ester monomers which are mercaptanized unsaturated triglycerides or mercaptanized epoxidized unsaturated triglycerides, and connected by polysulfide linkages having the structure —$S_Q$—, wherein Q is an integer greater than 1. The crosslinked thiol ester composition comprising crosslinked thiol ester oligomers can comprise at least three thiol ester monomers which are any mercaptanized unsaturated ester, any mercaptanized epoxidized unsaturated ester, any mercaptanized unsaturated natural source oil, any mercaptanized epoxidized unsaturated natural source oil, any mercaptanized unsaturated triglyceride, and/or any mercaptanized epoxidized unsaturated triglyceride described herein.

In an aspect, the cross-linked thiol ester composition comprises thiol ester monomers and thiol ester oligomers. In some embodiments, the cross-linked thiol ester composition has a combined thiol ester monomer and thiol ester oligomer average molecular weight greater than 2,000 (number-average molecular weight). In other embodiments, the cross-linked thiol ester composition has a combined thiol ester monomer and thiol ester oligomer average molecular weight greater than 5,000; or alternatively, greater than 10,000. In yet other embodiments, the cross-linked thiol ester composition has a combined thiol ester monomer and thiol ester oligomer average molecular weight ranging from 2,000 to 20,000; alternatively, from 3,000 to 15,000; or alternatively, from 7,500 to 12,500.

In an aspect, the thiol ester monomers and thiol ester oligomers have a total thiol sulfur content greater than 0.5 weight percent. In other embodiments, the thiol ester monomers and thiol ester oligomers have a total thiol sulfur content greater than 1; alternatively, greater than 2; or alternatively, greater than 4 weight percent. In yet other embodiments, the thiol ester monomers and the thiol ester oligomers have a total thiol sulfur content from 0.5 to 8; alternatively, from 4 to 8; or alternatively, from 0.5 to 4 weight percent.

In an aspect, the thiol ester monomers and thiol ester oligomers have a total sulfur content greater than 8 weight percent. In some embodiments, the thiol ester monomers and thiol ester oligomers have a total sulfur content greater than 10; or alternatively, greater than 12 weight percent. In yet other embodiments, the thiol ester monomers and thiol ester oligomers have a total sulfur content ranging from 8 to 15; alternatively, from 9 to 14; or alternatively, from 10 to 13 weight percent.

The cross-linked thiol ester compositions also can be described as a product produced by the process comprising contacting a thiol ester with an oxidizing agent, and can be further limited by the process as described herein.

Unsaturated Esters

The unsaturated ester used as a feedstock to produce the thiol ester compositions described herein can be characterized using a number of different methods. One method of characterizing the unsaturated ester feedstock is by the number of ester groups and the number of carbon-carbon double bonds that comprise each unsaturated ester molecule. Suitable unsaturated esters used as a feedstock to produce the thiol ester compositions described herein minimally comprise at least 1 ester group and at least 1 carbon-carbon double bond. However, beyond this requirement, the number of ester groups and carbon-carbon double bonds comprising the unsaturated esters are independent elements and can be varied independently of each other. Thus, the unsaturated esters can have any combination of the number of ester groups and the number of carbon-carbon double bonds described separately herein. Suitable unsaturated esters also can contain additional functional groups such as hydroxy, aldehyde, ketone, epoxy, ether, aromatic groups, and combinations thereof. As an example, the unsaturated esters also can comprise hydroxy groups. An example of an unsaturated ester that contains hydroxy groups is castor oil. Other suitable unsaturated esters will be apparent to those of skill in the art and are to be considered within the scope of the present invention.

Minimally the unsaturated ester comprises at least one ester group. In other embodiments, the unsaturated ester comprises at least 2 ester groups. Alternatively, the unsaturated ester comprises 3 ester groups. Alternatively, the unsaturated ester comprises 4 ester groups. Alternatively, the unsaturated ester includes from 2 to 8 ester groups. Alternatively, the unsaturated ester includes from 2 to 7 ester groups. Alternatively, the unsaturated ester includes from 3 to 5 ester groups. As another alternative, the unsaturated ester includes from 3 to 4 ester groups.

In other embodiments, the unsaturated ester comprises a mixture of unsaturated esters. In these situations, the number of ester groups is best described as an average number of ester groups per unsaturated ester molecule in the unsaturated ester composition. In some embodiments, the unsaturated esters have an average of at least 1.5 ester groups per unsaturated ester molecule; alternatively, an average of at least 2 ester groups per unsaturated ester molecule; alternatively, an average of at least 2.5 ester groups per unsaturated ester molecule; or alternatively, an average of at least 3 ester groups per unsaturated ester molecule. In other embodiments, the unsaturated esters have an average of from 1.5 to 8 ester groups per unsaturated ester molecule; alternatively, an average of from 2 to 7 ester groups per unsaturated ester molecule; alternatively, an average of from 2.5 to 5 ester groups per unsaturated ester molecule; alternatively, an average of from 3 to 4 ester groups per unsaturated ester molecule. In another embodiment, the unsaturated esters have an average of about 3 ester groups per unsaturated ester molecule or alternatively, an average of about 4 ester groups per unsaturated ester molecule.

Minimally, the unsaturated ester comprises at least one carbon-carbon double bond per unsaturated ester molecule. In an embodiment, the unsaturated ester comprises at least 2 carbon-carbon double bonds; alternatively, at least 3 carbon-carbon double bonds; or alternatively, at least 4 carbon-carbon double bonds. In other embodiments, the unsaturated ester comprises from 2 to 9 carbon-carbon double bonds; alternatively, from 2 to 4 carbon-carbon double bonds; alternatively, from 3 to 8 carbon-carbon double bonds; or alternatively, from 4 to 8 carbon-carbon double bonds.

In some embodiments, the unsaturated ester comprises a mixture of unsaturated esters. In this aspect, the number of carbon-carbon double bonds in the mixture of unsaturated ester is best described as an average number of carbon-carbon double bonds per unsaturated ester molecule. In some embodiments, the unsaturated esters have an average of at least 1.5 carbon-carbon double bonds per unsaturated ester molecule; alternatively, an average of at least 2 carbon-carbon double bonds per unsaturated ester molecule; alternatively, an average of at least 2.5 carbon-carbon double bonds per unsaturated ester molecule; or alternatively, an average of at least 3 carbon-carbon double bonds per unsaturated ester molecule. In other embodiments, the unsaturated esters have average of from 1.5 to 9 carbon-carbon double bonds per unsaturated ester molecule; alternatively, an average of from 3 to 8 carbon-carbon double bonds per unsaturated ester molecule; alternatively, an average of from 2 to 4 carbon-carbon double bonds per unsaturated ester molecule; or alternatively, from of 4 to 8 carbon-carbon double bonds per unsaturated ester molecule.

While the number (or average number) of ester groups and the number (or average number) of double bonds are independent elements of the unsaturated esters, particular embodiments are mentioned for illustrative purposes. In an embodiment, the unsaturated ester molecules have an average of at least 1.5 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of from 1.5 to 9 carbon-carbon double bonds per unsaturated ester molecule. As another alternative, the unsaturated ester molecules have an average of from 2 to 8 ester groups per unsaturated ester molecule and have an average of from 1.5 to 9 carbon-carbon double bonds per unsaturated ester.

In addition to the number (or average number) of ester groups and the number (or average number) of carbon-carbon double bonds present in the unsaturated ester molecules, the disposition of the carbon-carbon double bonds in unsaturated ester molecules having 2 or more carbon-carbon double bonds can be a consideration. In some embodiments where the unsaturated ester molecules have 2 or more carbon-carbon double bonds, the carbon-carbon double bonds can be conjugated. In other embodiments, the carbon-carbon double bonds can be separated from each other by only one carbon atom. When two carbon-carbon double bonds are separated by a carbon atom having two hydrogen atoms attached to it, e.g., a methylene group, these carbon-carbon double bonds can be termed as methylene interrupted double bonds. In yet other embodiments, the carbon-carbon double bonds are isolated, e.g., the carbon-carbon double bonds are separated from each other by 2 or more carbon atoms. In further embodiments, the carbon-carbon double bonds can be conjugated with a carbonyl group.

In some aspects, the unsaturated ester can be described as an ester of a polyol and unsaturated carboxylic acids. Within this description, the unsaturated carboxylic acid portion of the unsaturated ester can be called a polyol side chain (or more simply a side chain). In some embodiments, the unsaturated ester comprises less than 30 percent of side chains comprising methylene interrupted double bonds. In other embodiments, embodiments the unsaturated ester comprises greater than 30 percent of the side chains comprise methylene interrupted double bonds. In yet other embodiments, the unsaturated ester comprises less than 25 percent of side chains having 3 contiguous methylene interrupted carbon-carbon double bonds. In further embodiments, the unsaturated ester comprises less than 25 percent linolenic acid side chains. In further embodiments, the unsaturated ester comprises greater than 25 percent of side chains having 3 contiguous methylene interrupted carbon-carbon double bonds. In further embodiments, the unsaturated ester comprises greater than 25 percent linolenic acid side chains. In additional embodiments, the unsaturated ester comprises at least 30 percent side chains having 2 contiguous methylene interrupted carbon-carbon double bonds and less than 25 percent of side chains having 3 contiguous methylene interrupted carbon-carbon double bonds.

Additional functional groups also can be present in the unsaturated ester. A non-limiting list of functional groups includes a hydroxy group, an ether group, an aldehyde group, a ketone group, an amine group, a carboxylic acid group, among others, and combinations thereof. In an aspect, the unsaturated ester can comprise hydroxy groups. In some embodiments, the unsaturated esters have an average of at least 1.5 hydroxy groups per unsaturated ester molecule; alternatively, an average of at least 2 hydroxy groups per unsaturated ester molecule; alternatively, an average of at least 2.5 hydroxy groups per unsaturated ester molecule; or alternatively, an average of at least 3 hydroxy groups per unsaturated ester molecule. In other embodiments, the unsaturated esters have an average of from 1.5 to 9 hydroxy groups per unsaturated ester molecule; alternatively, an average of from 3 to 8 hydroxy groups per unsaturated ester molecule; alternatively, an average of from 2 to 4 hydroxy groups per unsaturated ester molecule; or alternatively, average of from of 4 to 8 hydroxy groups per unsaturated ester molecule. In an embodiment, the unsaturated ester comprises at least 2 hydroxy groups; alternatively, at least 3 hydroxy groups; or alternatively, at least 4 hydroxy groups. In other embodiments, the unsaturated ester comprises from 2 to 9 hydroxy groups; alternatively, from 2 to 4 hydroxy groups, alternatively, from 3 to 8 hydroxy groups; or alternatively, from 4 to 8 hydroxy groups.

An unsaturated ester in the context of this invention can be any unsaturated ester having the number of ester groups and carbon-carbon double bonds per unsaturated ester described herein. The unsaturated ester can be derived from natural sources, synthetically produced from natural source raw materials, produced from synthetic raw materials, produced from a mixture of natural and synthetic materials, or a combination thereof.

Unsaturated Natural Source Oil

Unsaturated natural source oils can be derived from naturally occurring nut, vegetable, plant, and animal sources. In an embodiment, the unsaturated ester is derived from genetically modified nuts, vegetables, plant, and animal sources. In an embodiment, the unsaturated ester comprises a triglyceride derived from genetically modified nuts, vegetables, plant, and animal sources.

In an aspect, the unsaturated natural source oil can comprise tallow, olive, peanut, castor bean, sunflower, sesame, poppy, seed, palm, almond seed, hazel-nut, rapeseed, canola, soybean, corn, safflower, canola, cottonseed, camelina, flaxseed, or walnut oil, and the like, or mixtures or combinations thereof. In some embodiments, the unsaturated natural source oil can comprise soybean, corn, castor bean, safflower, canola, cottonseed, camelina, flaxseed, or walnut oil, or combinations thereof. In other embodiments, the unsaturated natural source oil can comprise soybean oil, corn oil, castor bean oil, canola oil, or a combination thereof. In further embodiments, the unsaturated natural source oil can comprise soybean oil; alternatively, corn oil; alternatively, castor bean oil; or alternatively, canola oil.

The unsaturated natural source oils comprise triglycerides that can be described as an ester of glycerol and an unsaturated carboxylic acid. Within this description, the unsaturated carboxylic acid portion of the triglyceride can be called a glycerol side chain (or more simply a side chain). In some embodiments, the triglycerides which comprise the unsaturated natural source oil can comprise less than 30 percent of side chains comprising methylene interrupted double bonds. In other embodiments, the triglycerides which comprise the unsaturated natural source oil can comprise greater than 30 percent of the side chains comprising methylene interrupted double bonds. In yet other embodiments, the triglycerides which comprise the unsaturated natural source oil can comprise less than 25 percent of side chains having 3 contiguous methylene interrupted carbon-carbon double bonds. In further embodiments, the triglycerides which comprise the unsaturated natural source oil can comprise less than 25 percent linolenic acid side chains. In further embodiments, the triglycerides which comprise the unsaturated natural source oil can comprise greater than 25 percent of side chains having 3 contiguous methylene interrupted carbon-carbon double bonds. In further embodiments, the triglycerides which comprise the unsaturated natural source oil can comprise greater than 25 percent linolenic acid side chains. In additional embodiments, the triglycerides which comprise the unsaturated natural source oil can comprise at least 30 percent side chains having 2 contiguous methylene interrupted carbon-carbon double bonds and less than 25 percent of side chains having 3 contiguous methylene interrupted carbon-carbon double bonds.

In another embodiment, the unsaturated natural ester oil comprises natural triglycerides derived from unsaturated natural source oils. In an embodiment, the unsaturated ester is synthetic. In an embodiment, the unsaturated ester comprises both synthetic and natural raw materials. In an embodiment, the unsaturated ester comprises synthetic triglycerides.

Synthetic Unsaturated Esters

Synthetic unsaturated esters used as feedstock for aspects of this invention can be produced using methods for producing an ester group known to those skilled in the art. The term "ester group" means a moiety formed from the reaction of a hydroxy group and a carboxylic acid or a carboxylic acid derivative. Typically, the esters can be produced by reacting an alcohol with a carboxylic acid, transesterification of carboxylic acid ester with an alcohol, reacting an alcohol with a carboxylic acid anhydride, or reacting an alcohol with a carboxylic acid halide. Any of these methods can be used to produce the synthetic unsaturated esters used as a feedstock in aspects of this invention. The alcohol, unsaturated carboxylic acid, unsaturated carboxylic acid ester, and unsaturated carboxylic acid anhydride raw materials for the production of the unsaturated ester can be from natural, synthetic, genetic, or any combination of natural, genetic, and synthetic sources.

The polyols and the unsaturated carboxylic acids, simple unsaturated carboxylic acid esters, or unsaturated carboxylic acid anhydrides used to produce the unsaturated esters used as a feedstock in various aspects of this invention are independent elements. That is, these elements can be varied independently of each other and thus, can be used in any combination to produce an unsaturated ester suitable for use in the present invention.

Polyol Component—Synthetic Unsaturated Esters

The polyol used to produce an unsaturated ester can be any polyol or mixture of polyols capable of reacting with an unsaturated carboxylic acid, unsaturated simple carboxylic acid ester, carboxylic acid anhydride, or carboxylic acid halide, under reaction conditions known to those skilled in the art.

The number of carbon atoms in the polyol is not particularly important. In one aspect, the polyol used to produce the unsaturated ester can comprise from 2 to 20 carbon atoms. In other embodiments, the polyol comprises from 2 to 10 carbon atoms; alternatively from 2 to 7 carbon atoms; alternatively from 2 to 5 carbon atoms. In further embodiments, the polyol can be a mixture of polyols having an average of 2 to 20 carbon atoms; alternatively, an average of from 2 to 10 carbon atoms; alternatively, an average of 2 to 7 carbon atoms; or alternatively, an average of 2 to 5 carbon atoms.

In another aspect, the polyol used to produce the unsaturated ester can have any number of hydroxy groups needed to produce the unsaturated ester as described herein. In some embodiments, the polyol has 2 hydroxy groups; alternatively, 3 hydroxy groups; alternatively, 4 hydroxy groups; alternatively, 5 hydroxy groups; or alternatively, 6 hydroxy groups. In other embodiments, the polyol comprises at least 2 hydroxy groups; alternatively, at least 3 hydroxy groups; alternatively, at least 4 hydroxy groups; alternatively, at least 5 hydroxy groups; or alternatively, at least 6 hydroxy groups. In yet other embodiments, the polyol comprises from 2 to 8 hydroxy groups; alternatively, from 2 to 4 hydroxy groups; or alternatively, from 4 to 8 hydroxy groups.

In further aspects, the polyol used to produce the unsaturated ester is a mixture of polyols. In an embodiment, the mixture of polyols has an average of at least 1.5 hydroxy groups per polyol molecule. In other embodiments, the mixture of polyols has an average of at least 2 hydroxy groups per polyol molecule; alternatively, an average of at least 2.5 hydroxy groups per polyol molecule; alternatively, an average of at least 3 hydroxy groups per polyol molecule; or alternatively, an average of at least 4 hydroxy groups per polyol molecule. In yet another embodiments, the mixture of polyols has an average of 1.5 to 8 hydroxy groups per polyol molecule; alternatively, an average of 2 to 6 hydroxy groups per polyol molecule; alternatively, an average of 2.5 to 5 hydroxy groups per polyol molecule; alternatively, an average of 3 to 4 hydroxy groups per polyol molecule; alternatively, an average of 2.5 to 3.5 hydroxy groups per polyol molecule; or alternatively, an average of 2.5 to 4.5 hydroxy groups per polyol molecule.

In yet another aspect, the polyol or mixture of polyols used to produce the unsaturated thiol ester has a molecular weight or average molecular weight less than 500. In other embodiments, the polyol or mixture of polyols have a molecular weight or average molecular weight less than 300; alternatively less than 200; alternatively, less than 150; or alternatively, less than 100 (number-average molecular weight).

In some embodiments, suitable polyols include 1,2-ethanediol, 1,3-propanediol, 1,4-butanediol, 1,5-pentanediol, 1,6-hexanediol, dimethylolpropane, neopentylpropane, 2-propyl-2-ethyl-1,3-propanediol, 1,2-propanediol, 1,3-butanediol, diethylene glycol, triethylene glycol, polyethylene glycol, dipropylene glycol, tripropylene glycol, polypropylene glycol, cyclohexanedimethanol, 1,3-dioxane-5,5-dimethanol, 1,4-xylylenedimethanol, 1-phenyl-1,2-ethanediol, trimethylolpropane, trimethylolethane, trimethylolbutane, glycerol, 1,2,5-hexanetriol, pentaerythritol, ditrimethylolpropane, diglycerol, ditrimethylolethane, 1,3,5-trihydroxybenzene, 1,4-xylylenedimethanol, 1-phenyl-1,2-ethanediol, and the like, or any combination thereof. In further embodiments, the polyol can comprise glycerol, pentaerythritol, or a mixture thereof. In other embodiments, the polyol can comprise glycerol, or alternatively, can comprise pentaerythritol.

Carboxylic Acid or Equivalent Component—Synthetic Unsaturated Ester

The carboxylic acid component of an unsaturated ester can be any carboxylic acid or mixture of carboxylic acids comprising a carbon-carbon double bond. As the carboxylic acid component will be combined with a polyol or polyol mixture comprising an average of greater than 1.5 hydroxy groups or any other number of hydroxy groups described herein, the carboxylic acid component can be any mixture comprising unsaturated carboxylic acids that produces an unsaturated ester meeting the requirements described herein. In some embodiments, the carboxylic acid component can be any mixture of saturated carboxylic acids and unsaturated carboxylic acids that produces an unsaturated ester meeting the requirements described herein. Thus, the carboxylic acid or carboxylic acid mixture used to produce the synthetic unsaturated ester can be described as having an average number of a specified element per carboxylic acid.

Independent elements of the carboxylic acid include the average number of carboxylic acid groups per carboxylic acid molecule, the average number of carbon atoms present in the carboxylic acid, and the average number of carbon-carbon double bonds per carboxylic acid. Additional independent elements include the position of the double bond in the carbon chain, and the relative position of the double bonds in respect to each other when there are multiple double bonds.

Specific carboxylic acids used as a component of the carboxylic acid composition used to produce an unsaturated ester can have from 3 to 30 carbon atoms per carboxylic acid molecule. In some embodiments, the carboxylic acid is linear. In some embodiments, the carboxylic acid is branched. In some embodiments, the carboxylic acid is a mixture of linear and branched carboxylic acids. In some embodiments, the carboxylic acid can also comprise additional functional groups, including alcohols, aldehydes, ketones, and epoxides, among others.

Suitable carboxylic acids that can be used as a component of unsaturated carboxylic acid composition can have from 3 to 30 carbon atoms; alternatively 8 to 25 carbon atoms; or alternatively, from 12 to 20 carbon atoms. In other embodiments, the carboxylic acids comprising the unsaturated carboxylic acid composition comprise an average of 2 to 30 carbon atoms; alternatively an average of 8 to 25 carbon atoms; or alternatively, an average of from 12 to 20 carbon atoms.

The carbon-carbon double bond can be located anywhere along the length of the carbon-carbon chain. In one embodiment, the double bond can be located at a terminal position. In another embodiment, the carbon-carbon double bond can be located at internal position. In yet another embodiment, the carboxylic acid or mixture of carboxylic acids can comprise both terminal and internal carbon-carbon double bonds. The double bond also can be described by indicating the number of substitutions that are attached to carbon-carbon double bond. In some embodiments, the carbon-carbon double bond can be mono-substituted, disubstituted, trisubstituted, tetra-substituted, or a mixture of unsaturated carboxylic acids that can have any combination of monosubstituted, disubstituted, trisubstituted, and tetrasubstituted carbon-carbon double bonds. In other embodiments, the carbon-carbon double bond of the unsaturated carboxylic acid (or mixture of carboxylic acids) can be mono-substituted; alternatively, disubstituted; alternatively, trisubstituted; or alternatively, tetrasubstituted.

Suitable unsaturated carboxylic acids include, but are not limited to, acrylic, agonandoic, agonandric, alchornoic, ambrettolic, angelic, asclepic, auricolic, avenoleic, axillarenic, brassidic, caproleic, cetelaidic, cetoleic, civetic, CLA, coriolic, coronaric, crepenynic, densipolic, dihomolinoleic, dihomotaxoleic, dimorphecolic, elaidic, ephedrenic, erucic, gadelaidic, gadoleic, gaidic, gondolo, gondoleic, gorlic, helenynolic, hydrosorbic, isoricinoleic, keteleeronic, labellenic, lauroleic, lesquerolic, linelaidic, linderic, linoleic, lumequic, malvalic, mangold's, margarolic, megatomic, mikusch's, mycolipenic, myristelaidic, nervoic, obtusilic, oleic, palmitelaidic, petroselaidic, petroselinic, phlomic, physeteric, phytenoic, pyrulic, ricinelaidic, rumenic, selacholeic, sorbic, stearolic, sterculic, sterculynic, stillingic, strophanthus, tariric, taxoleic, traumatic, tsuduic, tsuzuic, undecylenic, vaccenic, vernolic, ximenic, ximenynic, ximenynolic, and the like, or combinations thereof. In further embodiments, suitable unsaturated carboxylic acids can comprise oleic, palmitoleic, ricinoleic, linoleic, or combinations thereof.

In some embodiments, the unsaturated ester can be produced by transesterification of a simple ester of the carboxylic acid, or mixture of carboxylic acids, described herein with the polyol compositions described herein. In some embodiments, the simple ester is a methyl or ethyl ester of the carboxylic acid, or mixture of carboxylic acids. In further embodiments, the simple carboxylic acid ester is a methyl ester of the carboxylic acids as described herein.

Epoxidized Unsaturated Esters

Epoxidized unsaturated esters can be used to produce hydroxy thiol ester compositions. Generally, the epoxidized unsaturated ester can be derived by epoxidizing any unsaturated ester described herein. The unsaturated ester utilized to form an epoxidized unsaturated ester can be derived from natural sources, synthetically produced from natural source raw materials, produced from synthetic raw materials, produced from a mixture of natural and synthetic materials, or a combination thereof.

Minimally, the epoxidized unsaturated ester comprises at least one epoxide group. In an embodiment, the epoxidized unsaturated ester comprises at least 2 epoxide groups; alternatively, at least 3 epoxide groups; or alternatively, at least 4 epoxide groups. In other embodiments, the epoxidized unsaturated ester comprises from 2 to 9 epoxide groups; alternatively, from 2 to 4 epoxide groups; alternatively, from 3 to 8 epoxide groups; or alternatively, from 4 to 8 epoxide groups.

In some embodiments, the unsaturated ester comprises a mixture of epoxidized unsaturated esters. In this aspect, the number of epoxide groups in the epoxidized unsaturated ester is best described as an average number of epoxide groups per epoxidized unsaturated ester molecule. In some embodiments, the epoxidized unsaturated esters have an average of at least 1.5 epoxide groups per epoxidized unsaturated ester molecule; alternatively, an average of at least 2 epoxide groups per epoxidized unsaturated ester molecule; alternatively, an average of at least 2.5 epoxide groups per epoxidized unsaturated ester molecule; or alternatively, an average of at least 3 epoxide groups per epoxidized unsaturated ester molecule. In other embodiments, the epoxidized unsaturated esters have average of from 1.5 to 9 epoxide groups per epoxidized unsaturated ester molecule; alternatively, an average of from 3 to 8 epoxide groups per epoxidized unsaturated ester molecule; alternatively, an average of from 2 to 4 epoxide groups per epoxidized unsaturated ester molecule; or alternatively, from of 4 to 8 epoxide group per epoxidized unsaturated ester molecule.

In an aspect, the epoxidized unsaturated ester can be an epoxidized unsaturated natural source oil ("epoxidized natural source oil"). The unsaturated natural source oil can be derived from naturally occurring nut, vegetable, plant, and animal sources. In an embodiment, the unsaturated ester is derived from genetically modified nuts, vegetables, plant, and animal sources. In an embodiment, the unsaturated ester comprises a triglyceride derived from genetically modified nuts, vegetables, plant, and animal sources.

In an aspect, the epoxidized unsaturated natural source oil can comprise epoxidized tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil, and the like, or combinations thereof. In some embodiments, the epoxidized natural source oil can comprise epoxidized soybean, corn, castor bean, safflower, canola, cottonseed, camelina, flaxseed, or walnut oil, or a combination thereof. In other embodiments, the epoxidized unsaturated natural source oil can comprise epoxidized soybean oil, epoxidized corn oil, epoxidized castor bean oil, epoxidized canola oil, or a combination thereof. In further embodiments, the epoxidized natural source oil can comprise epoxidized soybean oil; alternatively, epoxidized corn oil; alternatively, epoxidized castor bean oil; or alternatively, epoxidized canola oil.

Additional Polythiol Information

Additional information on polythiol compositions suitable for use in the present invention, and methods of producing such compositions, can be found in U.S. Patent Publication Nos. 2005/0197391 and 2006/0036110, the disclosures of which are incorporated herein by reference in their entirety.

Aminoplast Resin Compositions

Aminoplast-polythiol compositions of the present invention, and articles formed therefrom, utilize an aminoplast resin composition. Aminoplast resin compositions suitable for use in this invention can be derived by reacting a polyamine or polyamide compound with an aldehyde, followed by a subsequent etherification reaction with an alcohol.

Polyamine compounds contain two or more amino groups, while polyamide compounds contain two or more amido groups. Such compounds can include triazines, diazines, triazoles, guanadines, guanamines, and alkyl- and aryl-substituted derivatives of these compounds, including alkyl- and aryl-substituted ureas, alkyl- and aryl-substituted melamines, and the like, or combinations thereof. For instance, suitable polyamine or polyamide compounds can comprise, consist essentially of, or consist of, melamine, urea, glycoluril, benzoguanamine, acetoguanamine, formoguanamine, spiroguanamine, N,N'-dimethyl urea, benzourea, dicyandiamide, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, or combinations of two or more of these compounds.

An aminoplast resin composition can be derived from a polyamine compound. In one aspect, the polyamine compound can be a $C_1$-$C_{40}$ polyamine having at least two amine groups, wherein the amine groups are either a primary amine group, a secondary amine group, or a combination thereof. Alternatively, the polyamine compound can be a $C_1$-$C_{30}$ polyamine, a $C_1$-$C_{20}$ polyamine, a $C_1$-$C_{12}$ polyamine, or a $C_1$-$C_8$ polyamine. In another aspect, the polyamine compound can have the formula $R^1(NR^2H)_n$. In this formula, $R^1$ can be a $C_1$-$C_{20}$ organyl group or a $C_1$-$C_{20}$ hydrocarbyl group, and $R^2$, in each occurrence, can be H or a $C_1$-$C_{20}$ hydrocarbyl group, and n can be at least 2. In some aspects of this invention, $R^1$ can be a $C_1$-$C_8$ organyl group or a $C_1$-$C_8$ hydrocarbyl group, and $R^2$, in each occurrence, can be H or a $C_1$-$C_8$ hydrocarbyl group, and n can be equal to 2 or, alternatively, n can be equal to 3. In other aspects, $R^2$ can be H in each occurrence.

The $C_1$-$C_{20}$ hydrocarbyl group or $C_1$-$C_8$ hydrocarbyl group employed as $R^1$ and $R^2$ can be any alkyl group, aryl group, or alkylaryl group described herein. Alkyl groups include, but are not limited to, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and the like. Aryl and arylalkyl groups include, but are not limited to, phenyl, alkyl-substituted phenyl, naphthyl, alkyl-substituted naphthyl, phenyl-substituted alkyl, naphthyl-substituted alkyl, and the like.

Unless otherwise specified, the disclosure of an alkyl group is intended to include all structural isomers, linear or branched, of a given moiety. Additionally, unless otherwise specified, the disclosure of an alkyl group is intended to include all enantiomers and all diastereomers. As examples, unless otherwise specified, the term propyl is meant to include n-propyl and iso-propyl, the term butyl is meant to include n-butyl, iso-butyl, t-butyl, sec-butyl, and the term octyl includes n-octyl, 2-ethylhexyl and neooctyl, among other isomers. Unless otherwise specified, any aryl group or arylalkyl group used herein includes all structural isomers (regioisomers, and linear or branched isomers), enantiomers, and diastereomers. For example, the term tolyl is meant to include any possible substituent position, that is, 2-methylphenyl, 3-methylphenyl, and/or 4-methylphenyl, and the term the term xylyl includes 2,3-dimethylphenyl, 2,4-dimethylphenyl, 2,5-dimethylphenyl, 2,6-dimethylphenyl, 3,4-dimethylphenyl, 3,5-dimethylphenyl, and 3,6-dimethylphenyl.

In an aspect, the alkyl, aryl, and alkyl aryl groups which can be employed as $R^1$ and $R^2$ independently can be methyl, ethyl, n-propyl, iso-propyl, n-butyl, iso-butyl, t-butyl, n-pentyl, neo-pentyl, phenyl, benzyl, tolyl, xylyl (dimethylphenyl), trimethylphenyl, phenylethyl, phenylpropyl, phenylbutyl, propyl-2-phenylethyl, or naphthyl. In an aspect, the alkyl groups which can be employed as $R^1$ and $R^2$ independently can be methyl, ethyl, n-propyl, iso-propyl, n-butyl, iso-butyl, t-butyl, n-pentyl, and neo-pentyl. In an aspect, the aryl or aryl alkyl groups which can be employed as $R^1$ and $R^2$ independently can be phenyl, benzyl, tolyl, xylyl (dimethylphenyl), trimethylphenyl, phenylethyl, phenylpropyl, phenylbutyl, and propyl-2-phenylethyl; alternatively, phenyl; alternatively, benzyl; alternatively, tolyl; or alternatively, xylyl.

The $C_1$-$C_{20}$ organyl group or $C_1$-$C_8$ organyl group employed as $R^1$ can be any functional group described herein that contains an atom other than hydrogen and carbon. For instance, the organyl group can comprise, consist essentially of, or consist of, a diazine, a triazine, or a triazole, any of which can be substituted with an alkyl group, aryl group, or alkylaryl group. Hence, $R^1$ can comprise, consist essentially of, or consist of, 1,3,5-triazine in one aspect of this invention, and in another aspect, $R^1$ can comprise, consist essentially of, or consist of, 2-phenyl-1,3,5-triazine.

Yet, in other aspects of this invention, the polyamine compound can comprise, consist essentially of, or consist of, melamine, guanamine, a substituted guanamine, or any combination thereof. For instance, the polyamine compound can comprise, consist essentially of, or consist of, melamine; alternatively, guanamine; or alternatively, a substituted guanamine, such as benzoguanamine. Moreover, the polyamine compound can comprise, consist essentially of, or consist of, a diazine, a triazine, or a triazole moiety in some aspects of this invention.

An aminoplast resin composition can be derived from a polyamide compound. In one aspect, the polyamide compound can be a $C_1$-$C_{40}$ polyamide having at least two amide groups, wherein at least one hydrogen atom is attached to each amide nitrogen atom. Hence, the amide nitrogen can have one hydrogen atom or two hydrogen atoms. In another aspect, the polyamide compound can be a $C_1$-$C_{30}$ polyamide, a $C_1$-$C_{20}$ polyamide, a $C_1$-$C_{12}$ polyamide, or a $C_1$-$C_8$ polyamide. In yet another aspect, the polyamide compound can have either the formula $CO(NR^2H)_2$ or the formula $R^1(CO)(NR^2H)_n$. In these formulas, $R^1$ can be a $C_1$-$C_{20}$ organyl group or a $C_1$-$C_{20}$ hydrocarbyl group, and $R^2$, in each occurrence, can be H or a $C_1$-$C_{20}$ hydrocarbyl group, and n is at least 2. In some aspects, $R^1$ can be a $C_1$-$C_8$ organyl group or a $C_1$-$C_8$ hydrocarbyl group, and $R^2$, in each occurrence, can be H or a $C_1$-$C_8$ hydrocarbyl group, and n can be equal to 2 or, alternatively, n can be equal to 3. In other aspects, $R^2$ can be H in each occurrence.

Suitable organyl and hydrocarbyl selections for $R^1$ and hydrocarbyl selections for $R^2$ for the polyamide compound can be as described above for the polyamine compound. For instance, representative alkyl, aryl, and alkyl aryl selections for $R^1$ and $R^2$ independently can be methyl, ethyl, n-propyl, iso-propyl, n-butyl, iso-butyl, t-butyl, n-pentyl, neo-pentyl, phenyl, benzyl, tolyl, xylyl (dimethylphenyl), trimethylphenyl, phenylethyl, phenylpropyl, phenylbutyl, propyl-2-phenylethyl, or naphthyl.

Yet, in other aspects disclosed herein, the polyamide compound can comprise, consist essentially of, or consist of, urea, glycoluril, or a combination thereof. For instance, the polyamide compound can comprise, consist essentially of, or consist of, urea; or alternatively, glycoluril.

In the preparation of aminoplast resin compositions, the first step generally is the reaction of a polyamine or polyamide compound with an aldehyde. This reaction is often referred to as an alkylolation (or a methylolation, in the case of formaldehyde). A single aldehyde, or a mixture or combination of two or more aldehydes, can be used in this reaction. In one aspect of the present invention, the aldehyde can be a $C_1$-$C_{18}$ aldehyde. In another aspect, the aldehyde can be $C_1$-$C_{10}$ aldehyde. For instance, the aldehyde can comprise, consist essentially of, or consist of, formaldehyde, acetaldehyde, propionaldehyde, n-butyraldehyde, isobutyraldehyde, valeraldehyde, hexanaldehyde, octylaldehyde, crotonaldehyde, acrolein, benzaldehyde, furfural, glyoxal, glutaraldehyde, and the like, or combinations thereof. In yet another aspect, the aldehyde can comprise, consist essentially of, or consist of, formaldehyde; alternatively, acetaldehyde; or alternatively, benzaldehyde.

Depending upon the ratio of polyamine/polyamide to aldehyde, mixtures of partially alkylolated derivatives can result.

The molar ratio of amino/amido groups (e.g., primary and secondary) in the polyamine/polyamide compound to aldehyde groups in the aldehyde typically falls within a range from 1:10 to 50:1, from 1:2 to 25:1, or from 1:1 to 10:1. Alkylolated derivatives, which can be used to synthesize aminoplast resin compositions, can have the formula $R^1(NR^{12}R^{13})_n$. In this formula, $R^1$ is a $C_1$-$C_{20}$ organyl group or a $C_1$-$C_{20}$ hydrocarbyl group, wherein $R^{12}$ and $R^{13}$, in each occurrence, are independently —H, —CH$_2$OH, or CH$_2$OR$^{14}$, and n is at least 2. For instance, n can be equal to 2 or, alternatively, n can be equal to 3. In each occurrence, $R^{14}$ can be a $C_1$-$C_{10}$ hydrocarbyl group. Alternatively, in each occurrence, $R^{14}$ can be a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. In some aspects of this invention, $R^1$ can be a $C_1$-$C_{12}$ organyl group or a $C_1$-$C_{12}$ hydrocarbyl group, while in other aspects, $R^1$ can be a $C_1$-$C_8$ organyl group or a $C_1$-$C_8$ hydrocarbyl group.

In the preparation of aminoplast resin compositions, the second step generally is an etherification reaction with an alcohol. This reaction, based on the ratio of the alkylolated reaction product to the alcohol can result in complete or partial etherification. Oligomeric species—dimers, trimers, higher oligomers, and so forth—also can result from the preparation of an aminoplast resin composition, and such oligomeric products are also encompassed herein. Often, the alcohol employed is a monohydric alcohol. Suitable alcohols can include, but are not limited to, methanol, ethanol, propanol, isopropanol, n-butanol, isobutanol, pentanol, hexanol, heptanol, octanol, and the like, as well as benzyl alcohol, phenol, and other aromatic alcohols, cyclic alcohols such as cyclohexanol, monoethers of glycols, and halogen-substituted or other substituted alcohols, such as 3-chloropropanol and butoxyethanol. More than one alcohol can be used and, therefore, mixtures or combinations of alcohols are contemplated. For instance, mixtures of methanol/n-butanol, methanol/isobutanol, methanol/ethanol, methanol/isooctanol, and the like, can be employed. Any ratio of the respective alcohols can be used, but typically, the molar ratio is in a range of 10:1 to 1:10, for example, from 6:1 to 1:6, or from 3:1 to 1:3.

In the present invention, the alcohol used in the preparation of the aminoplast resin composition can comprise (or consist essentially of, or consist of) methanol. In another aspect, the alcohol can comprise (or consist essentially of, or consist of) ethanol. In still another aspect, the alcohol can comprise (or consist essentially of, or consist of) butanol (e.g., n-butanol, isobutanol, etc.). In yet another aspect, the alcohol can comprise (or consist essentially of, or consist of) benzyl alcohol.

In accordance with one aspect of this invention, the aminoplast resin composition can comprise, consist essentially of, or consist of, molecules having the formula:

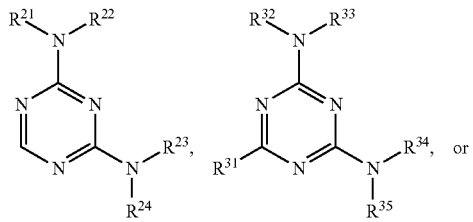

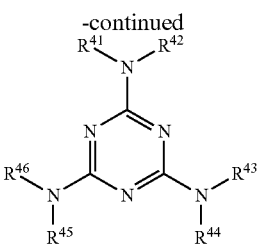

In these formulas, $R^{21}$, $R^{22}$, $R^{23}$, $R^{24}$, $R^{32}$, $R^{33}$, $R^{34}$, $R^{35}$, $R^{41}$, $R^{42}$, $R^{43}$, $R^{44}$, $R^{45}$, and $R^{46}$ independently can be —H, —CH$_2$OH, or CH$_2$OR$^{14}$, wherein $R^{14}$, in each occurrence, can be a $C_1$-$C_{10}$ hydrocarbyl group, and $R^{31}$ can be a methyl group or a phenyl group. In some aspects, the alkyl, aryl, and alkyl aryl groups which can be employed as $R^{14}$ independently can be methyl, ethyl, n-propyl, iso-propyl, n-butyl, t-butyl, n-pentyl, neo-pentyl, n-hexyl, n-heptyl, n-octyl, 2-ethyl hexyl, phenyl, benzyl, tolyl, xylyl (dimethylphenyl), trimethylphenyl, phenylethyl, phenylpropyl, naphthyl, and the like. For instance, $R^{14}$, in each occurrence, can be methyl, ethyl, n-propyl, iso-propyl, n-butyl, t-butyl, n-pentyl, neo-pentyl, n-hexyl, n-heptyl, n-octyl, or 2-ethyl hexyl; alternatively, $R^{14}$, in each occurrence, can be phenyl, benzyl, tolyl, xylyl (dimethylphenyl), trimethylphenyl, phenylethyl, phenylpropyl, or naphthyl; alternatively, $R^{14}$, in each occurrence, can be methyl, ethyl, n-propyl, iso-propyl, n-butyl, or t-butyl; alternatively, $R^{14}$, in each occurrence, can be methyl or n-butyl; or alternatively, $R^{14}$, in each occurrence, can be phenyl, benzyl, tolyl, or xylyl. In some aspects of this invention, $R^{21}$, $R^{22}$, $R^{23}$ and $R^{24}$ independently can be —H, —CH$_2$OH, or CH$_2$OR$^{14}$, wherein $R^{14}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. In other aspects of this invention, $R^{31}$ can be a methyl group or a phenyl group, and $R^{32}$, $R^{33}$, $R^{34}$ and $R^{35}$ independently can be —H, —CH$_2$OH, or CH$_2$OR$^{14}$, wherein $R^{14}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. Furthermore, in other aspects, $R^{41}$, $R^{42}$, $R^{43}$, $R^{44}$, $R^{45}$, and $R^{46}$ independently can be —H, —CH$_2$OH, or CH$_2$OR$^{14}$, wherein $R^{14}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl.

In accordance with another aspect of this invention, the aminoplast resin composition can comprise molecules having the formula:

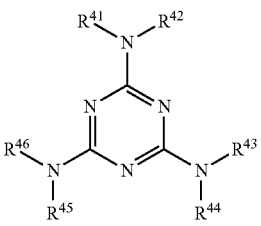

In this formula, $R^{41}$, $R^{42}$, $R^{43}$, $R^{44}$, $R^{45}$, and $R^{46}$ independently can be —H, —CH$_2$OH, or CH$_2$OR$^{14}$, wherein $R^{14}$, in each occurrence, can be a $C_1$-$C_{10}$ hydrocarbyl group. $R^{14}$ can be any $C_1$ to $C_{10}$ hydrocarbyl group described herein. Accordingly, for instance, $R^{41}$, $R^{42}$, $R^{43}$, $R^{44}$, $R^{45}$, and $R^{46}$ independently can be —H, —CH$_2$OH, or CH$_2$OR$^{14}$, wherein $R^{14}$, in each occurrence, can be a $C_1$-$C_8$ hydrocarbyl group; alternatively, a $C_1$-$C_8$ alkyl group; alternatively, methyl, ethyl, n-propyl, iso-propyl, n-butyl, t-butyl, or iso-butyl; or alternatively, methyl or butyl.

In accordance with yet another aspect of this invention, the aminoplast resin composition can comprise molecules having the formula:

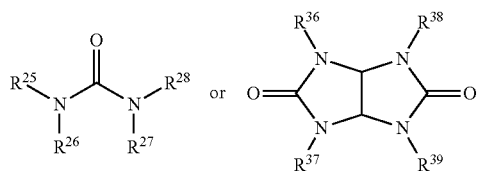

In these formulas, $R^{25}$, $R^{26}$, $R^{27}$, $R^{28}$, $R^{36}$, $R^{37}$, $R^{38}$, and $R^{39}$ independently can be —H, —CH$_2$OH, or CH$_2$OR$^{14}$, wherein $R^{14}$, in each occurrence, can be a $C_1$-$C_{10}$ hydrocarbyl group. $R^{14}$ can be any $C_1$ to $C_{10}$ hydrocarbyl group described herein. In some aspects of this invention, $R^{25}$, $R^{26}$, $R^{27}$ and $R^{28}$ independently can be —H, —CH$_2$OH, or CH$_2$OR$^{14}$, wherein $R^{14}$, in each occurrence, is a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. In other aspects of this invention, $R^{36}$, $R^{37}$, $R^{38}$ and $R^{39}$ independently can be —H, —CH$_2$OH, or CH$_2$OR$^{14}$, wherein $R^{14}$, in each occurrence, is a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl.

Representative aminoplast resin compositions that can be employed in the present invention include those materials commercially available under the RESIMENE®, CYMEL®, Luwipal®, and Plastopal® tradenames. Specific non-limiting examples include RESIMENE® 747 (methylated melamine-formaldehyde resin) and 755 (methylated-butylated melamine-formaldehyde resin); and CYMEL® 1123 (methylated-ethylated benzoguanamine-formaldehyde resin), 1170 (butylated glycoluril-formaldehyde resin), U-60 (methylated urea-formaldehyde resin), and U-80 (butylated urea-formaldehyde resin). Aminoplast resin compositions of this invention can comprise, for instance, partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea, hexabutoxymethylmelamine, tetrabutoxymethylglycoluril, dimethoxymethyldiethoxymethylglycoluril, and mixtures thereof.

Other information on aminoplast resins can be found, for example, in *Organic Coatings: Science and Technology*, Third Edition (2007), Chapter 11, Amino Resins, p. 213-230; and *Kirk-Othmer Encyclopedia of Chemical Technology*, Fifth Edition (2005), Volume 15, Melamine Resins, p. 773-796; the disclosures of which are incorporated herein by reference.

Catalyst

The catalyst employed in the reaction of aminoplast resin compositions with polythiol compositions can be an acid catalyst. For instance, sulfonic acids; hydrocarbyl sulfonic acids; hydrocarbyl phosphoric and phosphonic acids; hydrocarbyl acid pyrophosphates; carboxylic acids; sulfonimides; mineral acids; and mixtures or combinations thereof can be employed. Examples of suitable organic sulfonic acids include, but are not limited to, methanesulfonic acid, benzenesulfonic acid, para-toluenesulfonic acid, dodecylbenzenesulfonic acid, naphthalenesulfonic acid, dinonylnaphthalenedisulfonic acid, and the like, or combinations thereof. Non-limiting examples of phosphoric acids include hexafluorophosphoric acid, butylphosphoric acid, and the like, or combinations thereof. Examples of the hydrocarbyl (e.g., aryl, alkyl, and aralkyl) phosphates and pyrophosphates include phenyl, para-tolyl, methyl ethyl, benzyl, diphenyl, di-para-tolyl, di-methyl, di-ethyl, di-benzyl, phenyl-para-tolyl, methyl-ethyl, phenyl-benzyl phosphates and pyrophosphates, and the like, or combinations thereof. Non-limiting examples of carboxylic acids include benzoic acid, formic acid, acetic acid, propionic acid, butyric acid, dicarboxylic acids such as oxalic acid, fluorinated acids such as trifluoroacetic acid, and the like, or combinations thereof. Examples of sulfonimides include, but are not limited to, dibenzene sulfonimide, di-para-toluene sulfonimide, methyl-para-toluene sulfonimide, dimethyl sulfonimide, and the like, or combinations thereof. Non-limiting examples of mineral acids include nitric acid, sulfuric acid, phosphoric acid, poly-phosphoric acid, and the like, or combinations thereof.

In one aspect of this invention, the acid catalyst can comprise, consist essentially of, or consist of, an organic sulfonic acid. In another aspect, the acid catalyst can comprise, consist essentially of, or consist of, a hydrocarbyl sulfonic acid. In still another aspect, the acid catalyst can comprise, consist essentially of, or consist of, methanesulfonic acid, p-toluenesulfonic acid, dinonylnaphthlane disulfonic acid, p-dodecylbenzenesulfonic acid, hexafluorophosphoric acid, butylphosphoric acid, or any combination thereof. In yet another aspect, the acid catalyst can comprise, consist essentially of, or consist of, p-toluenesulfonic acid, dinonylnaphthlane disulfonic acid, p-dodecylbenzenesulfonic acid, or a combination thereof; or alternatively, methanesulfonic acid, p-toluenesulfonic acid, or a combination thereof. The acid catalyst can comprise, consist essentially of, or consist of, hexafluorophosphoric acid, butylphosphoric acid, or a combination thereof, in other aspects of this invention. Additionally, the acid catalyst employed in this invention can be a blocked acid catalyst, i.e., a catalyst in which the free catalyst is generated or liberated only at elevated temperatures.

In certain aspects disclosed herein, the acid catalyst can be p-toluenesulfonic acid. Specific non-limiting examples of commercial formulations of p-toluenesulfonic acid catalyst include CYCAT® 4040 and NACURE® 2530. Other representative acid catalysts that can be employed in the present invention include other catalytic materials commercially available under the CYCAT® and NACURE® tradenames.

If present, the weight percent of the catalyst in any formulation or composition disclosed herein (e.g., an aminoplast-polythiol composition, an aminoplast-polythiol coating formulation, etc.), can be in a range of from 0.01 to 5 weight percent based on the total weight of the aminoplast resin composition and the polythiol composition. In some aspects, the weight percent can be in a range from 0.1 to 4; alternatively, from 0.25 to 3; or alternatively, from 0.5 to 2.5. Generally, the weight percentage of the catalyst is based on the total weight of the aminoplast resin composition and the polythiol composition.

Solvent

According to another aspect of the present invention, aminoplast-polythiol compositions and other formulations disclosed herein (e.g., formulations for coating applications) can further comprise one or more solvents (or in alternative terminology, one or more diluents). Illustrative solvent types can include, for example, water, hydrocarbons and halogenated hydrocarbons, ethers, carbonates, esters, ketones, aldehydes, alcohols, and the like, including mixtures or combinations thereof.

Hydrocarbons and halogenated hydrocarbon can include, for example, aliphatic hydrocarbons, aromatic hydrocarbons, petroleum distillates, halogenated aliphatic hydrocarbons, halogenated aromatic hydrocarbons, and the like, or combinations thereof. Aliphatic hydrocarbons which can be useful as a solvent include $C_4$ to $C_{20}$ hydrocarbons, or alternatively, $C_5$ to $C_{10}$ hydrocarbons, and these solvents can be cyclic or acyclic and include linear or branched isomers, unless otherwise specified. Non-limiting examples of suitable acyclic aliphatic solvents include pentane, hexane, heptane, octane, and combinations thereof. Non-limiting examples of suitable cyclic aliphatic solvents include cyclohexane, methyl cyclohexane, and combinations thereof. Aromatic hydrocarbons which can be useful as a solvent include $C_6$ to $C_{20}$ aromatic hydrocarbons; or alternatively, $C_6$ to $C_{10}$ aromatic hydrocarbons. Non-limiting examples of suitable aromatic hydrocarbons include benzene, toluene, xylene (including ortho-xylene, meta-xylene, para-xylene, or mixtures thereof), and ethylbenzene, or combinations thereof. Halogenated aliphatic hydrocarbons which can be useful as a solvent include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. Non-limiting examples of such halogenated aliphatic hydrocarbons which can be utilized as a solvent include carbon tetrachloride, chloroform, methylene chloride, dichloroethane, trichloroethane, and combinations thereof. Halogenated aromatic hydrocarbons which can be useful as a solvent include $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

Ethers, carbonates, esters, ketones, aldehydes, or alcohols which can be useful as a solvent include $C_2$ to $C_{20}$ ethers, carbonates, esters, ketones, aldehydes, or alcohols; alternatively, $C_2$ to $C_{10}$ ethers, carbonates, esters, ketones, aldehydes, or alcohols; or alternatively, $C_2$ to $C_5$ ethers, carbonates, esters, ketones, aldehydes, or alcohols. Suitable ether solvents can be cyclic or acyclic. Non-limiting examples of suitable ethers which can be useful as a solvent include dimethyl ether, diethyl ether, methyl ethyl ether, monoethers or diethers of glycols (e.g., dimethyl glycol ether), furans, substituted furans, dihydrofuran, substituted dihydrofurans, tetrahydrofuran (THF), substituted tetrahydrofurans, tetrahydropyrans, substituted tetrahydropyrans, 1,3-dioxanes, substituted 1,3-dioxanes, 1,4-dioxanes, substituted 1,4-dioxanes, or mixtures thereof. In an embodiment, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group. Non-limiting examples of suitable carbonates which can be utilized as a solvent include ethylene carbonate, propylene carbonate, diethyl carbonate, diethyl carbonate, glycerol carbonate, and combinations thereof. Non-limiting examples of suitable esters which can be utilized as a solvent include ethyl acetate, propyl acetate, butyl acetate, isobutyl isobutyrate, methyl lactate, ethyl lactate, and combinations thereof. Non-limiting examples of suitable ketones which can be utilized as a solvent include acetone, ethyl methyl ketone, and combinations thereof. Non-limiting examples of suitable alcohols which can be utilized as a solvent include methanol, ethanol, propanol, isopropanol, n-butanol, isobutanol, pentanol, hexanol, heptanol, octanol, benzyl alcohol, phenol, cyclohexanol, and the like, or combinations thereof.

In one aspect of this invention, a solvent suitable for use in the present invention can comprise a hydrocarbon, an alcohol, a ketone, a carbonate, an ester, water, or any combination thereof. In another aspect, the solvent can comprise an alcohol, a ketone, a carbonate, an ester, water, or any combination thereof. In still another aspect, the solvent can comprise hexane, benzene, xylene, toluene, a petroleum distillate, or any combination thereof. In yet another aspect, the solvent can comprise acetone, methyl ethyl ketone, or a combination thereof; alternatively, methanol, ethanol, propanol, isopropanol, butanol, pentanol, hexanol, or any combination thereof; alternatively, ethyl acetate, propyl acetate, butyl acetate, methyl lactate, ethyl lactate, or any combination thereof; alternatively, ethylene carbonate, propylene carbonate, glycerol carbonate, or any combination thereof; or alternatively, water.

In some aspects of this invention, the solvent employed can comprise an aromatic hydrocarbon solvent, an ester solvent, an alcohol solvent, or a mixture of combination thereof. For example, the solvent can comprise xylene, butyl acetate, butanol, or a combination thereof. In other aspects, the solvent can comprise water and, optionally, can further comprise one or more additional solvents described herein.

If present, the amount of solvent used in compositions of this invention often can range from 10 to 70 weight percent, based on the total weight of the composition. For instance, the weight percent of the solvent in the composition can be in a range from 20 to 60 percent, or from 20 to 50 percent, in some aspects of this invention. Further, it is contemplated that the weight percent of the solvent in the composition can fall within a narrower range of from 20 to 40 percent in other aspects of this invention.

Aminoplast-Polythiol Compositions

In accordance with one aspect of this invention, an aminoplast-polythiol composition is provided and, in this aspect, the composition comprises a contact product of:

a) an aminoplast resin composition; and b) a polythiol composition comprising thiol ester molecules having an average of two or more thiol groups per molecule.

An aminoplast-polythiol composition in another aspect of this invention comprises a cured reaction product of:

a) an aminoplast resin composition; and b) a polythiol composition comprising thiol ester molecules having an average of two or more thiol groups per molecule.

These aminoplast-polythiol compositions can employ any of the aforementioned aminoplast resin compositions and polythiol compositions provided in the preceding sections. For example, the aminoplast resin composition can comprise, consist essentially of, or consist of, an aminoplast resin derived from a polyamine or polyamide compound (e.g., melamine, benzoguanamine, urea, glycoluril, etc.), such as a methylated melamine-formaldehyde resin, a methylated-butylated melamine-formaldehyde resin, a methylated-ethylated benzoguanamine-formaldehyde resin, a butylated glycoluril-formaldehyde resin, a methylated urea-formaldehyde resin, a butylated urea-formaldehyde resin, and the like, or combinations thereof. Likewise, polythiol compositions can comprise thiol ester molecules having an average of two or more thiol groups per molecule, and such compositions can comprise:

a) a thiol ester composition comprising, consisting essentially of, or consisting of, thiol ester molecules derived from an unsaturated ester, from an unsaturated natural source oil, and/or from an unsaturated triglyceride;

b) a hydroxy thiol ester composition comprising, consisting essentially of, or consisting of, hydroxy thiol ester molecules derived from an epoxidized unsaturated ester, from an epoxidized unsaturated natural source oil, and/or from an epoxidized unsaturated triglyceride;

c) a crosslinked thiol ester composition comprising, consisting essentially of, or consisting of, crosslinked thiol ester oligomers having at least three thiol ester monomers derived from an unsaturated ester, from an epoxidized unsaturated ester, from an unsaturated natural source oil, from an epoxidized unsaturated natural source oil, from an unsaturated triglyceride, and/or from an epoxidized unsaturated triglyceride, and connected by polysulfide linkages having the structure $-S_Q-$, wherein Q is an integer greater than 1; or d) any combination thereof.

In some aspects of the present invention, an aminoplast-polythiol composition can comprise a contact product of (or alternatively, a cured reaction product of):

a) an aminoplast resin composition;

b) a polythiol composition comprising thiol ester molecules having an average of two or more thiol groups per molecule;

c) an acid catalyst; and d) a solvent.

In further aspects, an aminoplast-polythiol composition can comprise a contact product of (or alternatively, a cured reaction product of):

a) 10 to 50 percent by weight of an aminoplast resin composition;

b) 25 to 75 percent by weight of a polythiol composition;

c) 0.1 to 3 percent by weight of an acid catalyst; and d) 15 to 60 percent by weight of a solvent.

The amounts of each component are weight percentages based on the total weight of all four components.

In another aspect, any of the contact products and cured reaction products disclosed herein (e.g., comprising an aminoplast resin composition and a polythiol composition) can further comprise molecules or compounds containing a functional group capable of reacting with an aminoplast resin composition. Polyols would be representative of such molecules or compounds containing a functional group capable of reacting with an aminoplast resin composition. Suitable polyols were described above.

In other aspects, the present invention contemplates methods for curing any of these aminoplast-polythiol compositions. For instance, this invention is not limited to any particular temperature and humidity conditions required to cure these aminoplast-polythiol compositions, nor to any specific cure time. However, the aminoplast-polythiol compositions disclosed herein generally can be reacted and/or cured at a temperature in a range from 40° C. to 200° C. In some aspects, the cure temperature can fall within a range from 50° C. to 180° C., from 60° C. to 170° C., or from 70° C. to 160° C. Accordingly, the cure temperature can be in the range of from 80° C. to 150° C., such as, for example, from 90° C. to 135° C., or from 100° C. to 130° C.

The cure time (or reaction time) can vary depending upon the cure temperature, however, the cure time generally is in a range from 1 minute to 48 hours, from 3 minutes to 36 hours, or from 5 minutes to 24 hours. In one aspect of this invention, the cure time is in a range from 6 minutes to 18 hours, from 7 minutes to 12 hours, from 8 minutes to 8 hours, or from 10 minutes to 6 hours. Further, the cure time can be within a range from 10 minutes to 4 hours, from 20 minutes to 3 hours, or from 30 minutes to 2 hours, in other aspects of this invention.

Aminoplast-polythiol compositions obtained by contacting or reacting/curing the aminoplast resin and polythiol compositions, in accordance with the present invention, can be utilized in end-use applications that include, but are not limited to, a paint primer, a paint topcoat, a coil coating, an appliance coating, a metal can coating, a metal container coating, and the like. Articles of manufacture comprising these aminoplast-polythiol compositions also are contemplated and encompassed by the present invention.

Methods of making an aminoplast-polythiol composition also are provided herein. One such method can comprise reacting an aminoplast resin composition with a polythiol composition comprising thiol ester molecules having an average of two or more thiol groups per molecule, optionally in the presence of an acid catalyst. In a further aspect, the reaction can be conducted in the presence of a solvent, e.g., water, one or more hydrocarbon solvents, etc.

Another method of making an aminoplast-polythiol composition can comprise:

a) forming a first part comprising a aminoplast resin composition;

b) forming a second part comprising a polythiol composition, the polythiol composition comprising thiol ester molecules having an average of two or more thiol groups per molecule;

c) contacting the first part with the second part in the presence of an acid catalyst to form a mixture; and d) optionally, curing the mixture.

In this method, either the first part, the second part, or both parts, can contain the acid catalyst. Additionally, or alternatively, the acid catalyst can be added separately to the mixture. Further, either the first part, the second part, or both parts, can further comprise one or more solvents. The order of addition of the various components in the disclosed compositions is not critical to the resulting composition, formulation, article, coating, etc., and, therefore, all variations in the order of mixing and combining the various components is within the scope of this invention.

In accordance with the aminoplast-polythiol compositions and methods of making aminoplast-polythiol compositions disclosed herein, the molar ratio of ether and hydroxy groups in the aminoplast resin composition to thiol and hydroxy groups in the polythiol composition can range from 3:1 to 1:3. Yet, in some aspects, the molar ratio can be in a range from 2:1 to 1:2, from 1.5:1 to 1:1.5, or from 1.5:1 to 1:1.

Articles

The present invention also is directed to articles of manufacture comprising the compositions disclosed herein. For example, an article can comprise an aminoplast-polythiol composition, the aminoplast-polythiol composition comprising a contact product of, or a cured reaction product of:

a) an aminoplast resin composition; and b) a polythiol composition comprising thiol ester molecules having an average of two or more thiol groups per molecule.

The article can be, or can comprise, a coating, such as a paint primer, a paint topcoat, a coil coating, an appliance coating, a metal can coating, or a metal container coating, and the like. In some aspects of this invention, a coating is provided, and this coating can comprise a cured reaction product of:

a) an aminoplast resin composition; and b) a polythiol composition comprising thiol ester molecules having an average of two or more thiol groups per molecule.

In other aspects, a coating can comprise a cured reaction product of an aminoplast resin composition, a polythiol composition, and a catalyst; alternatively, a coating can comprise a cured reaction product of an aminoplast resin composition, a polythiol composition, and a solvent; or alternatively, a coating can comprise a cured reaction product of an aminoplast resin composition, a polythiol composition, a catalyst, and a solvent.

Optionally, various additives can be present in the compositions, articles, coatings, etc., disclosed herein, dependent upon the desired properties. These additives can include, but are not limited to, catalysts, solvents, plasticizers, fillers, fibers, pigments, pigment dispersing agents, flow modifiers, surface modifiers, antioxidants or stabilizers, or combinations thereof.

Articles of manufacture can comprise a substrate at least partially covered with an aminoplast-polythiol composition or coating, i.e., any of the compositions or coatings disclosed herein. Accordingly, coated substrates that comprise a substrate at least partially covered with compositions or coatings described herein are also within the scope of this invention. Generally, substrates that can employed in this invention can comprise metal, concrete, wood, paper, plastic, or combinations thereof. In one aspect, the substrate comprises metal, or alternatively, is a metal part or metal article.

Coatings in accordance with the present invention typically have a thickness between 5 and 500 μm, depending upon the type of application, the targeted substrate, the expected environmental conditions, and so forth. For example, the coating can have a thickness in a range from 20 to 300 μm, or from 50 to 250 μm.

The fitness for use of a particular coating can be assessed using various analytical tests that are known in the art, such as impact resistance, mandrel bend, Persoz hardness, solvent resistance, gloss, and so forth. Coatings of the present invention can be characterized by having an impact resistance (forward or reverse) of at least 20 in-lb. For instance, the impact resistance can be at least 50 in-lb, at least 75 in-lb, at least 100 in-lb, or at least 150 in-lb. In an aspect, the impact resistance is in a range from 20 to 250 in-lb; alternatively, from 25 to 225 in-lb; or alternatively, from 30 to 200 in-lb. Cure times often are assessed using Persoz pendulum hardness. It is contemplated that coatings of the present invention can have a Persoz hardness in a range from 100 to 300 seconds, or from 110 to 270 seconds. For example, the Persoz hardness can fall within a range from 110 to 240 seconds, or from 110 to 200 seconds. In some aspects of this invention, the coating can be characterized as having a mandrel bend of less than 0.75 inches. In other aspects, the coating can have a mandrel bend of less than 0.6 inches, less than 0.5 inches, less than 0.4 inches, or less than 0.25 inches.

The chemical resistance of a coating can be important for certain applications. Coatings of this invention typically can have a MEK resistance of at least 100 double rubs. Further, coatings of this invention can have a MEK resistance of at least 150 double rubs, or at least 200 double rubs, in some aspects of this invention. Coatings described herein also can have chemical resistance to certain acids. For instance, a coating of this invention can have an acid resistance adequate to exhibit no visual damage or permanent loss of hardness when exposed to a 5% aqueous HCl solution for 12 hours, or for 24 hours.

This invention also discloses methods of coating a substrate, or producing a coated substrate. One such method can comprise:

a) preparing a mixture comprising:

i) an aminoplast resin composition;

ii) a polythiol composition comprising thiol ester molecules having an average of two or more thiol groups per molecule; and iii) an acid catalyst;

b) applying the mixture to a surface of the substrate; and c) curing the mixture onto the surface of the substrate.

Optionally, the mixture can further comprise a solvent, such as one or more hydrocarbon solvents. Yet, another method of coating a substrate, or producing a coated substrate, is provided in this invention, and this method can comprise the following steps:

a) forming a first part comprising an aminoplast resin composition;

b) forming a second part comprising a polythiol composition comprising thiol ester molecules having an average of two or more thiol groups per molecule;

c) contacting the first part with the second part on a surface of the substrate in the presence of an acid catalyst to form a mixture; and d) curing the mixture onto the surface of the substrate.

In this method, either the first part, the second part, or both parts, can contain the acid catalyst. Additionally, or alternatively, the acid catalyst can be added separately to the mixture. Further, either the first part, the second part, or both parts, can further comprise one or more solvents.

Coating compositions or formulations can be applied to a substrate by a variety of techniques, including, for example, dipping, rolling, brushing, spraying, squeeging, backrolling, pouring, troweling, and the like. Combinations of these techniques also can be used. The coating composition can be used on both interior and exterior surfaces of substrates, if desired.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Table I summarizes the raw materials used in these examples. Information on some of the commercial resins and crosslinkers was limited; therefore, some of the information in Table I was estimated from available information. Since the compositions of the examples were formulated on a weight basis using guidance from the manufacturers, the estimates were not critical to the aminoplast-polythiol formulation, but may lead to some variation, for instance, in calculations of molar stoichiometry and polymer network parameters.

TABLE I

Summary of Raw Materials.

| Raw Material | Supplier | Type or Description | % Solids | Mn | Fn | EW |
|---|---|---|---|---|---|---|
| Polymercaptan 407 | Chevron Phillips | Mercaptanized epoxidized soybean oil (hydroxy thiol ester) | 100 | 1040 | 5.2 | 200 |
| Polymercaptan 358 | Chevron Phillips | Mercaptanized soybean oil | 100 | 988 | 3.1 | 318 |
| Polymac™ HS 57-5776 | Hexion | Polyester polyol | 86.3 | 699 | 2.2 | 315 |
| Joncryl® 588 | BASF | Acrylic polyol | 68 | 3786 | 5.6 | 676 |
| Joncryl® 906 | BASF | Acrylic polyol | 72 | 4332 | 5.2 | 833 |
| Resimene® 747 | Ineos Melamines | Methylated melamine-formaldehyde resin | 100 | 515 | 7.6-8.4 | 61-68 |
| Resimene® 755 | Ineos Melamines | Methylated/butylated melamine-formaldehyde resin | 100 | 568 | 8.4 | 68 |
| Cymel® 1123 | Cytec Ind. | Methylated/ethylated benzoguanamine-formaldehyde Resin | 100 | 470 | 4 | 117 |
| Cymel® 1170 | Cytec Ind. | Butylated glycouril-formaldehyde resin | 100 | 487 | 4 | 122 |
| Cymel® U-80 | Cytec Ind. | Butylated urea-formaldehyde resin | 100 | 593 | 6 | 99 |
| Cycat® 4040 | Cytec Ind. | p-Toluenesulfonic acid | 40 | — | — | — |
| Nacure® 2530 | King Ind. | Amine-blocked sulfonic acid | 25 | — | — | — |
| Butyl acetate | Sigma Aldrich | Anhydrous, >99% | — | — | — | — |
| Xylenes | Fisher Scientific | Certified ACS grade | — | — | — | — |
| n-Butanol | Sigma-Aldrich | 99.8% grade | — | — | — | — |
| 5-methyl-2-hexanone (MIAK) | Sigma Aldrich | 99% grade | — | — | — | — |

Notes on Table I:
Mn—Number average molecular weight.
Fn—Functionality (estimated).
EW—Functional group equivalent weight.
Polymercaptan 407 is a polythiol composition having an average of about 3 ester groups, an average of about 2.8 thiol groups, an average of about 2.8 hydroxy groups, and an average of about 7.6 percent thiol sulfur per hydroxy thiol ester molecule.
Polymercaptan 358 is a polythiol composition having an average of about 3 ester groups, an average of about 2.9 thiol groups, and an average of about 9.7 percent thiol sulfur per thiol ester molecule.

The general formulation and coating preparation procedures for Examples 1-10 were conducted as follows. The functional resin—i.e., the polythiol (Polymercaptan 407, Polymercaptan 358), Polymac® polyester polyol, or Joncryl® acrylic polyol—was added into a clean 250-mL Erlenmeyer flask. If a blend of resins was tested, the polythiol was added first, followed by the polyol. Next, a solvent formulation (typically 70:30 butyl acetate/xylenes by weight) was added, the headspace was purged with nitrogen, the flask was sealed with a rubber stopper, and the flask was swirled until the resin was completely dissolved. The dissolution time of the resin was impacted, for instance, by the viscosity of the resin. Next, the aminoplast resin (e.g., a melamine resin) was added to the flask, which was again swirled to dissolve the aminoplast resin. The catalyst (e.g., a sulfonic acid) was added and mixed, just before aliquots of the formulation were removed from the flask and used to prepare coatings drawn down using a 5 mil WFT drawdown bar on 12 test panels. The panels were allowed to stand briefly, and then transferred to a temperature-calibrated vented oven controlled at the desired cure temperature.

The test panels were cold-rolled steel (CRS) matte or aluminum panels that were pre-washed in a hood with hexanes, then pre-washed with 2-propanol, allowed to dry, and placed on a flat lab bench protected with plastic sheeting. This process was conducted less than an hour before the coatings were applied. Typically, in the examples, six 4"×6" panels and six 4"×12" panels were used for each formulation.

Two test panels (one 12-inch panel and one 6-inch panel) were periodically removed from the oven at 10, 20, 30, 40, 60, and 120 minutes, and allowed to cool to room temperature (about 5 minutes). The coatings were tested for tack. If not tacky, the coatings were tested for MEK resistance (12-inch panel) and Persoz pendulum hardness (6-inch panel), among other tests, after reaching room temperature.

For Examples 11-18, the test panels were cold-rolled steel (CRS) pre-coated with Bonderite® 1000. These panels were pre-washed with isopropanol only and then treated as described above. Typically for these examples, one 4"×6" panel and four 4"×12" panels were used for each tested variation. For example, if two temperatures and two cure times were tested, the formulation would be coated on four 4"×6" panels and sixteen 4"×12" panels.

Analytical testing was performed as follows. For the Tack test, a clean cotton ball was lightly touched to the surface of the coating and moved across the surface of the coating. If the cotton ball stuck to the coating, or made a permanent mark on the coating surface, the test result was Fail. If the cotton ball had no effect, the test result was Pass.

In the MEK Resistance test, a small amount of technical grade methyl ethyl ketone (MEK) was squirted onto the coating in one spot, and a cotton swab was rubbed back and forth across the wet area of the coating, holding the swab tip firmly but lightly against the coating. Each back and forth stroke was referred to as a double rub. The number of strokes was counted, but if the resistance of the coating was felt to increase (e.g., due to solvent softening or removal of the coating), or after 100 double rubs, whichever came first, the MEK was gently dried and the test area inspected to see if there was any visible damage, whitening, or softening of the coating. If there was no damage, another 50 double rubs were performed. This process was continued until either the coating appeared to be affected, or at least 200 double rubs had been reached. The coating was re-wet with fresh MEK, as necessary, to ensure liquid MEK was present on the rub area during the test. The highest number of double rubs the coating was able to withstand before suffering damage was reported as the MEK resistance. If the coating became damaged in under 50 double rubs, the coating was re-tested with fewer strokes to get a more accurate result. The reported "MEK Cure Time" was the minimum cure time of a coated panel required to achieve a resistance of at least 200 double rubs in the presence of MEK.

Persoz pendulum hardness was tested using a Gardner Model 707 KP Covered Hardness Rocker set-up, following the supplied standard method. Conical mandrel bend testing was conducted according to ASTM Method D 522-93a (reapproved 2001), entitled "Mandrel Bend Test of Attached Organic Coating." Cross-hatch adhesion was tested according to ASTM method D3359-02, entitled "Standard Test Methods for Measuring Adhesion by Tape Test." Gloss at 20, 60 and 85 degrees was measured using a Byk-Gardner microTRI-gloss instrument. Differential Scanning Calorimetry (DSC) was measured using a TA Instruments DSC Q100 using a 10° C./min ramp rate. Forward and reverse impacts were measured according to ASTM method D2794, and pencil scratch hardness according to ASTM method D3363.

Acid resistance was conducted as follows. In a fume hood, 2-3 drops of the test acid (5% aqueous HCl or glacial acetic acid) were added to the coated panel. A small piece of cotton (roughly ⅓ of a cotton ball) was placed in the liquid and more of the respective acid was added to the cotton until it was visibly saturated. A 2-inch diameter watch glass was used to cover the test area and lightly press down the cotton. After the test period (24 hours for 5% HCl or 4.5 hours for glacial acetic acid), the watch glass and cotton were removed and the coating was flushed with tap water to clean it. The test area was lightly dried and examined for the effect of the acid on the coating. The results were described and recorded.

Example 1-10

Aminoplast/Polythiol Formulations and Coating Properties

In these examples, two polythiol compositions (Polymercaptan 358 and Polymercaptan 407) were compared with a commercial polyester polyol (Polymac® HS 57-5776 from Hexion) and two acrylic polyols (Joncryl® 588 and 906). The aminoplast resin was either Resimene® 747 (a hexamethyl etherified resin) or Resimene® 755 (a mixed methyl/butyl etherified resin).

Table II lists the coating formulations of Examples 1-10 by weight, and Table III lists the coating formulations of Examples 1-10 by weight percentages. As shown in the tables, the coating formulations used an excess of melamine reactive groups over the resin functional groups.

Table IV displays the actual catalyst charge used in each coating example. The formulations of Examples 1-5 were split into either two or three parts to test different catalyst loadings and cure times. For instance, the formulation of Example 3 was split into 2 parts, each evaluated with a specific catalyst loading and cure time (Coating Examples 3A and 3B). Coating Example 1B was discarded due to temperature variation during the curing process.

Table V summarizes the formulation, cure temperature, and cure time, hardness, and mandrel bend test results for Coating Examples 1A-10A. Generally, Examples 1A-2B demonstrate that a higher cure temperature and higher loading of the catalyst results in a faster cure time and more rapid hardness development. As compared to the Resimene® 747, the methylated/butylated melamine Resimene® 755 resulted in softer cured coatings; compare Coating Examples 3A-3B to Coating Examples 1C-2B. Examples 4A-5B illustrate that the Polymac® polyester provided a harder coating as compared to coatings produced using Polymercaptan 407. Complete or nearly complete cure was achieved at a cure time of one hour for the coatings cured at 127° C., as measured by Persoz hardness development. Coatings prepared using the Joncryl® acrylic polyols (7A-8A) had hardness values in between those of the Polymac® polyester resin and the Polymac/Polymercaptan 407 blend.

The amine-blocked p-toluenesulfonic acid catalyst (Nacure® 2530) was compared with the unblocked Cycat® 4040. While a higher level of Nacure® 2530 was used relative to Cycat® 4040, the Nacure is more dilute (25%) as supplied. The Nacure® formulation also utilized MIAK as solvent in place of the butyl acetate/xylenes mixture. In comparing Coating Example 6A to 2A in Table V, the Nacure® catalyst provided faster hardness development. Curing Coating Example 6B at 140° C. resulted in complete hardness development in 30 minutes Coating Examples 2A, 4A, and 6A were over-baked at 140° C. for 96 hours to investigate the drop-off in hardness over time. Each example exhibited a drop-off in hardness, although the reduction was greater for the Nacure® example. The Polymac® formulation using Cycat® catalyst had a greater reduction in hardness than the coating produced using the Polymercaptan 407.

Coating Examples 9A-10A utilized Polymercaptan 358 and provided softer coatings than comparable Polymercaptan 407 coatings, as well as longer cure times.

Table V lists mandrel bend test results performed on coatings cured for 1 hour. Generally, the lowest crack length (e.g., <⅛") was a better result and indicated better coating flexibility. Coating Examples 3A-3B using Polymercaptan 407 resulted in good coating flexibility.

Overall, the initial study of Examples 1-10 showed that cure development responded strongly to bake temperature, and catalyst level accelerated the initial cure rate. Importantly, the coatings based on Polymercaptan 407 were significantly softer than those based on the Polymac® resin. However, conditions were identified (e.g., 127° C. and 0.75-1.0 wt % Cycat® 4040) for rapid cure of Polymercaptan 407-based formulations. Polymercaptan 407 provided superior acid resistance but reduced flexibility as measured by mandrel bend, relative to commercial resins. In the subsequent examples, additional experiments are described to show an experimental design around test conditions identified from the results of Examples 1-10.

TABLE II

Coating formulations of Examples 1-10.

| Example | 1 | 2 | 3 | 4 | 5 | 6 | 7 | 8 | 9 | 10 |
|---|---|---|---|---|---|---|---|---|---|---|
| Polymercaptan 407 (g) | 101.5 | 69.7 | 71.7 | | 35.7 | 39.0 | | | | |
| Polymercaptan 358 (g) | | | | | | | | | 20.3 | 39.1 |
| Polymac ® 57-5776 (g) | | | | 70.1 | 35.9 | | | | 20.7 | |
| Joncryl ® 588 (g) | | | | | | | | 51.8 | | |
| Joncryl ® 906 (g) | | | | | | | 48.9 | | | |
| 70:30 Butyl acetate/xylene (g) | 59.8 | 40.5 | 41.8 | 40.6 | 41.5 | | | | 19.8 | 22.7 |
| Xylenes (g) | | | | | | | 8.5 | 6.1 | | |
| MIAK (g) | | | | | | 22.0 | | | | |
| Cycat ® 4040 (g) | * | * | * | * | * | | 0.395 | 0.403 | 0.401 | 0.404 |
| Nacure ® 2530 (g) | | | | | | 1.25 | | | | |
| Resimene ® 747 (g) | 35.6 | 24.7 | | 24.5 | 25.1 | 13.5 | 18.5 | 18.2 | 14.1 | 13.5 |
| Resimene ® 755 (g) | | | 25.1 | | | | | | | |
| Total batch diluted (g) | 198.2 | 136.2 | 138.5 | 135.2 | 138.2 | 75.8 | 76.2 | 76.5 | 75.3 | 75.7 |
| Total resin solids (g) | 137.9 | 95.2 | 96.7 | 84.9 | 91.8 | 52.9 | 53.8 | 53.5 | 52.4 | 52.8 |
| Melamine/Resin index (%) | 113 | 114 | 103 | 179 | 140 | 113 | 464 | 349 | 160 | 162 |
| Solids (%) | 70 | 70 | 70 | 63 | 66 | 70 | 71 | 70 | 70 | 70 |

Notes on Table II:
The amount of catalyst used in Examples 1-5 was varied. The same basic formulation shown in Table II was evaluated with different catalyst levels, see Table IV.
The melamine/resin index is an estimate of the melamine to resin equivalent ratio.

TABLE III

Coating formulations of Examples 1-10 in weight percentages.

| Example | 1 | 2 | 3 | 4 | 5 | 6 | 7 | 8 | 9 | 10 |
|---|---|---|---|---|---|---|---|---|---|---|
| Polymercaptan 407 (%) | 51.6 | 51.7 | 51.7 | | 25.8 | 51.5 | | | | |
| Polymercaptan 358 (%) | | | | | | | | | 26.9 | 51.6 |
| Polymac ® 57-5776 (%) | | | | 51.8 | 26.0 | | | | 27.5 | |
| Joncryl ® 588 (%) | | | | | | | | 67.7 | | |
| Joncryl ® 906 (g) | | | | | | | 64.1 | | | |
| 70:30 Butyl acetate/xylene (%) | 30.4 | 30.0 | 30.2 | 30.1 | 30.0 | | | | 26.3 | 30.0 |
| Xylenes (%) | | | | | | | 11.1 | 8.0 | | |
| MIAK (%) | | | | | | 29.0 | | | | |
| Cycat ® 4040 (%) | * | * | * | * | * | | 0.52 | 0.53 | 0.53 | 0.53 |
| Nacure ® 2530 (%) | | | | | | 1.7 | | | | |
| Resimene ® 747 (%) | 18.1 | 18.3 | | 18.1 | 18.2 | 17.9 | 24.2 | 23.7 | 18.7 | 17.9 |
| Resimene ® 755 (%) | | | 18.1 | | | | | | | |
| Melamine/Resin weight ratio | 0.35 | 0.35 | 0.35 | 0.35 | 0.35 | 0.35 | 0.38 | 0.35 | 0.34 | 0.35 |

Notes on Table III:
The amount of catalyst used in Examples 1-5 was varied. The same basic formulation shown in Table III was evaluated with different catalyst levels, see Table IV.

TABLE IV

Catalyst loading and cure temperatures for Coating Examples 1A-10A.

| Coating Example | Net Weight (g) | Actual Catalyst (g) | Bake Temperature (° C.) |
|---|---|---|---|
| 1A | 67.5 | 0.237 | 110 |
| 1B | 67.7 | 0.291 | aborted |
| 1C | 63.0 | 0.453 | 110 |
| 2A | 66.7 | 0.355 | 127 |
| 2B | 67.9 | 0.476 | 110 |
| 3A | 68.5 | 0.362 | 127 |
| 3B | 70.0 | 0.481 | 110 |
| 4A | 67.1 | 0.372 | 127 |
| 4B | 68.0 | 0.480 | 110 |
| 5A | 69.5 | 0.368 | 127 |
| 5B | 68.7 | 0.535 | 110 |
| 6A | * | * | 127 |
| 6B | * | * | 140 |
| 7A | * | * | 127 |
| 8A | * | * | 127 |
| 9A | * | * | 127 |
| 10A | * | * | 127 |

Notes on Table IV:
In Coating Examples 1A-6A, the catalyst was added last to the formulation.
In Examples 7A-10A, the catalyst was added before the aminoplast resin.
In Coating Examples 6A-10A, the weight of the formulation and the catalyst loading are provided in Table II.

TABLE V

Summary of Coating Examples 1A-10A.

| Coating Example | Resin | Resimene | Catalyst | Cure Temp (° C.) | Catalyst (%) | MEK Cure Time (min) | Hardness 30 min | Hardness 1 hour | Hardness 2 hours | Mandrel Bend (in) |
|---|---|---|---|---|---|---|---|---|---|---|
| 1A | Polymercaptan 407 | 747 | Cycat ® 4040 | 110 | 0.5 | 40 | 21 | 126 | — | — |
| 1C | Polymercaptan 407 | 747 | Cycat ® 4040 | 110 | 1.0 | 10 | 145 | 183 | 196 | >3/4 |
| 2A | Polymercaptan 407 | 747 | Cycat ® 4040 | 127 | 0.75 | 20 | 143 | 173 | 184 | >3/4 |
| 2B | Polymercaptan 407 | 747 | Cycat ® 4040 | 110 | 1.0 | 30 | 56 | 126 | 173 | >3/4 |
| 3A | Polymercaptan 407 | 755 | Cycat ® 4040 | 127 | 0.75 | 20 | 89 | 98 | 99 | 3/16 |
| 3B | Polymercaptan 407 | 755 | Cycat ® 4040 | 110 | 1.0 | 40 | 43 | 72 | 98 | <1/8 |
| 4A | Polymac ® | 747 | Cycat ® 4040 | 127 | 0.75 | 20 | 351 | 364 | 378 | <1/8 |
| 4B | Polymac ® | 747 | Cycat ® 4040 | 110 | 1.0 | 30 | 291 | 338 | 357 | <1/8 |
| 5A | Blend | 747 | Cycat ® 4040 | 127 | 0.75 | 20 | 203 | 261 | 266 | >3/4 |
| 5B | Blend | 747 | Cycat ® 4040 | 110 | 1.0 | 30 | 138 | 227 | 256 | >3/4 |
| 6A | Polymercaptan 407 | 747 | Nacure ® 2530 | 127 | 2.4 | 20 | 183 | 199 | 189 | >3/4 |
| 6B | Polymercaptan 407 | 747 | Nacure ® 2530 | 140 | 2.4 | 10 | 196 | 194 | 173 | >3/4 |
| 7A | Joncryl ® 906 | 747 | Cycat ® 4040 | 126 | 0.75 | 20 | 312 | 297 | — | >3/4 |
| 8A | Joncryl ® 588 | 747 | Cycat ® 4040 | 126 | 0.75 | 10 | 314 | 315 | — | >3/4 |
| 9A | Polymercaptan 358 Blend | 747 | Cycat ® 4040 | 127 | 0.75 | >60 | 119 | 127 | — | — |
| 10A | Polymercaptan 358 | 747 | Cycat ® 4040 | 127 | 0.75 | fail | 85 | 88 | — | 3/8 |

Examples 11-13

Aminoplast/Polythiol Formulations and Coating Properties

Three formulations were prepared using varying weight ratios of the Polymercaptan 407 resin to melamine resin (Resimene° 747). The composition of these formulations is shown in Table VI. These three formulations were coated on panels as described above. For Examples 11-12, half the panels were placed in an oven at 120° C., and the other half were placed in an oven at 132° C. Half of the panels in each of the two ovens were taken out at 30 min cure time, and the other half taken out at 60 min cure time. For Example 13, all the panels were placed in ovens set at 126° C. All of these panels were taken out at 45 min cure time. The cure conditions for each set of panels are summarized in Table VII.

The resulting coating properties were tested as described above, and the results are summarized in Table VIII and Table IX. All the coatings showed excellent MEK resistance and gloss values. Crosshatch adhesion was unexpectedly poor on the Bonderite° coated steel panels, with Example 12 slightly better than Example 11 or 13. Mandrel bend results were best for Example 12, which was formulated with the highest ratio of resin (Polymercaptan 407) to melamine crosslinker. Example 12 also resulted in the softest coating, as measured by both pendulum hardness and pencil hardness, and by far the highest impact resistance. The Tg onset by DSC analysis was below room temperature for Example 12, which correlates with its improved flexibility.

Acid resistance testing was also conducted on a few samples. Representative panels of the formulation based on Polymercaptan 407 (Example 13C) and the acrylic resins Joncryl° 588 and 906 (Examples 7 and 8) were tested for acid resistance. Acrylic resins are typically used in exterior coatings because they provide excellent acid resistance and are non-hydrolyzable. Thus, it was hypothesized that acid resistance could represent a rigorous test of the hydrophobicity of the Polymercaptan 407-based coating. The results were surprising, showing that the Polymercaptan 407 stood up to exposure to both 5% aqueous HCl (24 hours) and undiluted acetic acid (4.5 hours) far better than the acrylic resins. The Joncryl° 588 formulation (Example 8) softened visibly on exposure to the acetic acid, but recovered after drying. The Joncryl® 906 (Example 7) coating completely dissolved during exposure. Neither acid had any effect on the Polymercaptan 407-based coating (Example 13C).

TABLE VI

Coating formulations of Examples 11-13.

| | Example | | |
|---|---|---|---|
| | 11 | 12 | 13 |
| Polymercaptan 407 (g) | 75.4 | 79.7 | 45.2 |
| 70:30 Butyl acetate/xylene (g) | 45.8 | 45.1 | 41.8 |
| Cycat ® 4040 (g) | 1.1 | 1.0 | 1.0 |
| Resimene ® 747 (g) | 30.2 | 24.1 | 26.8 |
| Total batch diluted (g) | 152.5 | 149.9 | 150.4 |
| Total resin solids (g) | 106.0 | 104.2 | 104.6 |
| Melamine/Resin index (%) | 118 | 89 | 102 |
| Solids (%) | 70 | 70 | 70 |

TABLE VII

Cure Conditions for Examples 11A-13D.

| Coating Example | Cure Temp (° C.) | Cure Time (min) | Resin/Melamine Weight Ratio |
|---|---|---|---|
| 11A | 120 | 30 | 2.5 |
| 11B | 120 | 60 | 2.5 |
| 11C | 132 | 30 | 2.5 |
| 11D | 132 | 60 | 2.5 |
| 12A | 120 | 30 | 3.3 |
| 12B | 120 | 60 | 3.3 |
| 12C | 132 | 30 | 3.3 |
| 12D | 132 | 60 | 3.3 |
| 13A | 126 | 45 | 2.9 |
| 13B | 126 | 45 | 2.9 |
| 13C | 126 | 45 | 2.9 |
| 13D | 126 | 45 | 2.9 |

TABLE VIII

Summary of Coating Examples 11A-13D.

| Coating Example | MEK Resistance (double rubs) | 20° Gloss (%) | 60° Gloss (%) | 85° Gloss (%) | DSC Tg Onset (° C.) | DSC Tg Inflection (° C.) |
|---|---|---|---|---|---|---|
| 11A | >200 | 93.4 | 102.7 | 97.3 | 33.3 | 48.5 |
| 11B | — | 94.7 | 102.7 | 96.2 | 33.3 | 52.2 |
| 11C | >200 | 94.3 | 103.0 | 98.8 | 39.9 | 47.2 |
| 11D | — | 93.8 | 102.0 | 98.8 | 32.4 | 50.5 |
| 12A | >200 | 93.6 | 102.0 | 98.4 | 9.0 | 9.4 |
| 12B | >200 | 94.2 | 103.0 | 97.7 | 30.6 | 32.0 |
| 12C | >200 | 93.1 | 101.3 | 96.8 | 10.5 | 43.5 |
| 12D | — | 93.9 | 101.3 | 97.2 | 30.8 | 48.1 |
| 13A | >200 | 92.9 | 101.3 | 94.3 | 30.7 | 47.4 |
| 13B | — | 93.3 | 102.3 | 93.4 | 30.7 | 47.4 |
| 13C | >200 | 94.0 | 102.0 | 96.0 | 42.0 | 46.5 |
| 13D | — | 93.3 | 102.0 | 95.4 | 42.0 | 46.5 |

TABLE IX

Summary of Coating Examples 11A-13D.

| Coating Example | Forward Impact (in-lb) | Reverse Impact (in-lb) | Mandrel Bend (in) | Crosshatch Adhesion (rating) | Pencil Hardness (rating) |
|---|---|---|---|---|---|
| 11A | >97 | 45 | ¼ | 1b | B |
| 11B | 30 | <10 | >⅞ | 0b | F |
| 11C | 40 | 0 | >⅞ | 0b | B |
| 11D | 45 | 0 | >⅞ | 0b | F |
| 12A | >97 | 95 | <⅛ | 1b | 3B |
| 12B | >97 | 40 | <⅛ | 2b | 2B |
| 12C | >97 | 35 | <⅛ | 1b | B |
| 12D | >97 | 25 | ¼ | 2b | B |
| 13A | 70 | 20 | ⅜ | 0b | B |
| 13B | 70 | 10 | >⅞ | 0b | B |
| 13C | 60 | 15 | >⅞ | 0b | B |
| 13D | 55 | 15 | ⅜ | 0b | B |

Examples 14-16

Aminoplast/Polythiol Formulations and Coating Properties

Three formulations were prepared using different aminoplast resins to illustrate that the scope of the invention is well beyond that of melamine resins, and extends to other types of aminoplast materials as well as phenol-formaldehyde condensation products, materials well known to those skilled in the art.

The composition of these example formulations is summarized in Table X. These three formulations were coated on panels as described above and placed in an oven at 132° C. Half of the panels were taken out at 30 min cure time, and the other half taken out at 60 min cure time. Property testing results are summarized in Table XI. All coatings cured well as evidenced by MEK resistance, and resulted in relatively soft coatings as evidenced by Persoz pendulum hardness. Hardness, gloss, and impact results varied with the type of aminoplast resin used. The softest coating (Example 16) was obtained from the urea-formaldehyde resin, which also gave very low gloss values, but good flexibility by crosshatch, mandrel and impact. The hardest of the three examples was Example 15, produced from the glycouril resin, and showed worse impact, crosshatch adhesion, and mandrel bend. The highest gloss and best overall balance of properties for the three examples was obtained from Example 14, utilizing the benzoguanamine resin.

As is well-known to those skilled in the art, all of these types of aminoplast resins can be used in blends with each other, with melamine resins, and with phenol-formaldehyde resins, depending upon the end-use application, the balance of desired properties, and cost, among other considerations.

TABLE X

Coating formulations of Examples 14-16.

| | Example | | |
|---|---|---|---|
| | 14 | 15 | 16 |
| Polymercaptan 407 (g) | 72.76 | 36.90 | 31.26 |
| 75:25 Butyl acetate/xylene (g) | 45.09 | 23.00 | |
| Butyl acetate (g) | | | 16.83 |
| n-Butanol (g) | | | 5.85 |
| Cycat ® 4040 (g) | 1.11 | 0.66 | 0.53 |
| Cymel ® 1123 (g) | 31.64 | | |
| Cymel ® 1170 (g) | | 16.98 | |
| Cymel ® U-80 | | | 22.16 |
| Resimene ® 747 (g) | 30.2 | 24.1 | 26.8 |
| Total batch diluted (g) | 150.6 | 77.5 | 76.6 |
| Total resin solids (g) | 104.8 | 54.1 | 53.6 |
| Melamine/Resin index (%) | 74% | 76% | 143% |
| Solids (%) | 70% | 70% | 70% |
| Resin Type | benzoguanamine | glycouril | urea-formaldehyde |
| Cure Temp (° C.) | 132 | 132 | 132 |

TABLE XI

Summary of Coating Examples 14A-16B.

| Coating Example | Cure Time (min) | MEK Resistance (double rubs) | Persoz Hardness (sec) | 20° Gloss (%) | 60° Gloss (%) | Forward Impact (in-lb) | Reverse Impact (in-lb) | Crosshatch Adhesion (rating) | Pencil Hardness (rating) | Conical Mandrel Bend (in) |
|---|---|---|---|---|---|---|---|---|---|---|
| 14A | 30 | >200 | 134 | 47.2 | 86.4 | >192 | >192 | 4 | F | <1/8 |
| 14B | 60 | >200 | 131 | 63.9 | 99.1 | >192 | >192 | 5 | HB | <1/8 |
| 15A | 30 | >200 | 151 | 45.4 | 87.8 | 92 | 28 | 2 | F | 3/16 |

TABLE XI-continued

Summary of Coating Examples 14A-16B.

| Coating Example | Cure Time (min) | MEK Resistance (double rubs) | Persoz Hardness (sec) | 20° Gloss (%) | 60° Gloss (%) | Forward Impact (in-lb) | Reverse Impact (in-lb) | Crosshatch Adhesion (rating) | Pencil Hardness (rating) | Conical Mandrel Bend (in) |
|---|---|---|---|---|---|---|---|---|---|---|
| 15B | 60 | >200 | 153 | 42.8 | 87.1 | 80 | 28 | 3 | H | 1/4 |
| 16A | 30 | >200 | 116 | 18.5 | 56.1 | 140 | 60 | 5 | B | <1/8 |
| 16B | 60 | >200 | 111 | 24.8 | 61.3 | 140 | 120 | 5 | HB | <1/8 |

Example 17-18

Aminoplast/Polythiol Formulations and Coating Properties

Two formulations were prepared using the Polymac® resin or Polymercaptan 407 with Resimene® 747 (as in some of Examples 1-10). However, the butyl acetate and xylene solvents were replaced with ethyl lactate and butanol, as a potentially more environmentally friendly solvent blend. As is well known to those skilled in the art, ethyl lactate is biodegradable, derived from corn, and breaks down readily on hydrolysis to yield ethanol and lactic acid.

These two formulations were coated on panels as described above and placed in an oven at 135° C. Half of the panels were taken out at 60 min cure time, and the other half taken out at 90 min cure time. A slightly higher cure temperature and cure time were utilized to ensure drying of the coatings, since ethyl lactate is less volatile than butyl acetate.

The two formulations are shown in Table XII, and the property testing results are presented in Table XIII. Formulations containing ethyl lactate give good properties, comparable to the butyl acetate/xylenes solvent mixture. Utilizing the ethyl lactate solvent resulted in a Polymercaptan 407 based coating (Example 18) that had superior gloss relative to the Polymac resin based coating, although it was also softer and showed lower flexibility, as measured by impact and conical mandrel bend testing.

TABLE XII

Coating formulations of Examples 17-18.

| | Example | |
|---|---|---|
| | 17 | 18 |
| Polymercaptan 407 (g) | | 68.2 |
| Polymac 57-5776 (g) | 74.9 | |
| Ethyl Lactate (g) | 25.9 | 33.6 |
| n-Butanol (g) | 8.7 | 11.8 |
| Cycat ® 4040 (g) | 1.2 | 1.4 |
| Resimene ® 747 (g) | 40.0 | 37.0 |
| Total batch diluted (g) | 150.7 | 151.8 |
| Total resin solids (g) | 105.1 | 105.7 |
| Melamine/Resin index (%) | 248% | 160% |
| Solids (%) | 70% | 70% |

We claim:

1. An aminoplast-polythiol composition comprising a contact product of:
   a) an aminoplast resin composition; and
   b) a polythiol composition comprising thiol ester molecules having an average of two or more thiol groups per molecule;
   wherein the polythiol composition comprises:
      (i) a thiol ester composition comprising thiol ester molecules derived from an unsaturated natural source oil;
      (ii) a hydroxy thiol ester composition comprising hydroxy thiol ester molecules derived from an epoxidized unsaturated natural source oil;
      (iii) a crosslinked thiol ester composition comprising crosslinked thiol ester oligomers having at least three thiol ester monomers derived from an unsaturated natural source oil or from an epoxidized unsaturated natural source oil, and connected by polysulfide linkages having the structure —$S_Q$—, wherein Q is an integer greater than 1; or
      iv) any combination thereof.

2. The aminoplast-polythiol composition of claim 1, wherein the thiol ester composition comprises thiol ester molecules derived from an unsaturated natural source oil, the thiol ester molecules having:
   an average of from 2 to 8 ester groups per thiol ester molecule,
   an average of from 2 to 9 thiol groups per thiol ester molecule, and
   an average of from 5 to 25 weight percent thiol sulfur per thiol ester molecule.

3. The aminoplast-polythiol composition of claim 1, wherein the thiol ester composition comprises thiol ester molecules derived from an unsaturated natural source oil, the thiol ester molecules having:
   an average of from 2.5 to 5 ester groups per thiol ester molecule,
   an average of from 2 to 6 thiol groups per thiol ester molecule, and
   an average of from 6 to 15 weight percent thiol sulfur per thiol ester molecule.

TABLE XIII

Summary of Coating Examples 17A-18B.

| Coating Example | Cure Time (min) | Cure Temp (° C.) | MEK Resistance (double rubs) | Persoz Hardness (sec) | 20° Gloss (%) | 60° Gloss (%) | 85° Gloss (%) | Forward Impact (in-lb) | Reverse Impact (in-lb) | Crosshatch Adhesion (rating) | Pencil Hardness (rating) | Conical Mandrel Bend (in) |
|---|---|---|---|---|---|---|---|---|---|---|---|---|
| 17A | 60 | 135 | >200 | 332 | 70.8 | 104.7 | 94.5 | >184 | 148 | 5b | 5H | <1/8 |
| 17B | 90 | 135 | >200 | 342 | 70.5 | 105.3 | 94.6 | >184 | 120 | 5b | 5H | <1/8 |
| 18A | 60 | 135 | >200 | 273 | 93.6 | 108.0 | 96.2 | 30 | <2 | 5b | H | 3/8 |
| 18B | 90 | 135 | >200 | 288 | 91.5 | 107.3 | 96.3 | 30 | 6 | 5b | 2H | 3/8 |

4. The aminoplast-polythiol composition of claim 3, wherein the thiol ester molecules have an average molar ratio of cyclic sulfide groups to thiol group per thiol ester molecule of less than 1.

5. The aminoplast-polythiol composition of claim 3, wherein the unsaturated natural source oil comprises soybean oil, corn oil, castor bean oil, canola oil, or a combination thereof.

6. The aminoplast-polythiol composition of claim 1, wherein the hydroxy thiol ester composition comprises hydroxy thiol ester molecules derived from an epoxidized unsaturated natural source oil, the hydroxy thiol ester molecules having:
   average of from 2 to 7 ester groups per hydroxy thiol ester molecule,
   an average of from 2 to 9 thiol groups per hydroxy thiol ester molecule,
   an average of from 2 to 9 hydroxy groups per hydroxy thiol ester molecule, and
   an average of from 5 to 25 weight percent thiol sulfur per hydroxy thiol ester molecule.

7. The aminoplast-polythiol composition of claim 1, wherein the hydroxy thiol ester composition comprises hydroxy thiol ester molecules derived from an epoxidized unsaturated natural source oil, the hydroxy thiol ester molecules having:
   average of from 2 to 4 ester groups per hydroxy thiol ester molecule
   an average of from 2 to 6 thiol groups per hydroxy thiol ester molecule,
   an average of from 2 to 5 hydroxy groups per hydroxy thiol ester molecule, and
   an average of from 6 to 15 weight percent thiol sulfur per hydroxy thiol ester molecule.

8. The aminoplast-polythiol composition of claim 7, wherein the epoxidized unsaturated natural source oil comprises epoxidized soybean oil, epoxidized corn oil, epoxidized castor bean oil, epoxidized canola oil, or a combination thereof.

9. The aminoplast-polythiol composition of claim 1, wherein the aminoplast resin composition is derived from a polyamine compound, a polyamide compound, or a combination thereof.

10. The aminoplast-polythiol composition of claim 1, wherein the aminoplast resin composition is derived from a polyamine compound comprising melamine, guanamine, a substituted guanamine, or a combination thereof.

11. The aminoplast-polythiol composition of claim 1, wherein the aminoplast resin composition is derived from a polyamide compound comprising urea, glycoluril, or a combination thereof.

12. The aminoplast-polythiol composition of claim 1, wherein the aminoplast resin composition comprises molecules having the formula:

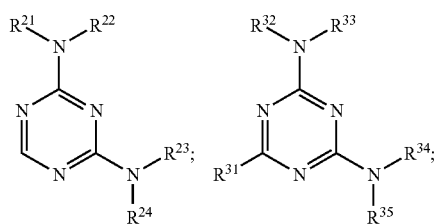

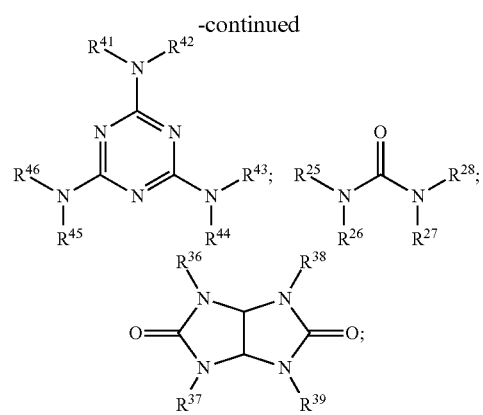

or any combination thereof;
wherein:
$R^{31}$ is a methyl group or a phenyl group; and
$R^{21}, R^{22}, R^{23}, R^{24}, R^{25}, R^{26}, R^{27}, R^{28}, R^{32}, R^{33}, R^{34}, R^{35}, R^{36}, R^{37}, R^{38}, R^{39}, R^{41}, R^{42}, R^{43}, R^{44}, R^{45}$, and $R^{46}$ independently are —H, —CH$_2$OH, or CH$_2$OR$^{14}$; wherein $R^{14}$, in each occurrence, is a $C_1$-$C_{10}$ hydrocarbyl group.

13. An article of manufacture comprising the aminoplast-polythiol composition of claim 1.

14. A coating comprising a cured reaction product of:
a) an aminoplast resin composition; and
b) a polythiol composition comprising thiol ester molecules having an average of two or more thiol groups per molecule;
wherein the polythiol composition comprises:
   (i) a thiol ester composition comprising thiol ester molecules derived from an unsaturated natural source oil;
   (ii) a hydroxy thiol ester composition comprising hydroxy thiol ester molecules derived from an epoxidized unsaturated natural source oil;
   (iii) a crosslinked thiol ester composition comprising crosslinked thiol ester oligomers having at least three thiol ester monomers derived from an unsaturated natural source oil or from an epoxidized unsaturated natural source oil, and connected by polysulfide linkages having the structure —S$_Q$—, wherein Q is an integer greater than 1; or
   iv) any combination thereof.

15. The coating of claim 14, wherein the thiol ester composition comprises thiol ester molecules derived from an unsaturated natural source oil, the thiol ester molecules having:
   an average of from 2.5 to 5 ester groups per thiol ester molecule,
   an average of from 2 to 6 thiol groups per thiol ester molecule, and
   an average of from 6 to 15 weight percent thiol sulfur per thiol ester molecule.

16. The coating of claim 14, wherein the hydroxy thiol ester composition comprises hydroxy thiol ester molecules derived from an epoxidized unsaturated natural source oil, the hydroxy thiol ester molecules having:
   average of from 2 to 4 ester groups per hydroxy thiol ester molecule
   an average of from 2 to 6 thiol groups per hydroxy thiol ester molecule,
   an average of from 2 to 5 hydroxy groups per hydroxy thiol ester molecule, and an average of from 6 to 15 weight percent thiol sulfur per hydroxy thiol ester molecule.

17. The coating of claim 14, wherein the aminoplast resin composition comprises molecules having the formula:

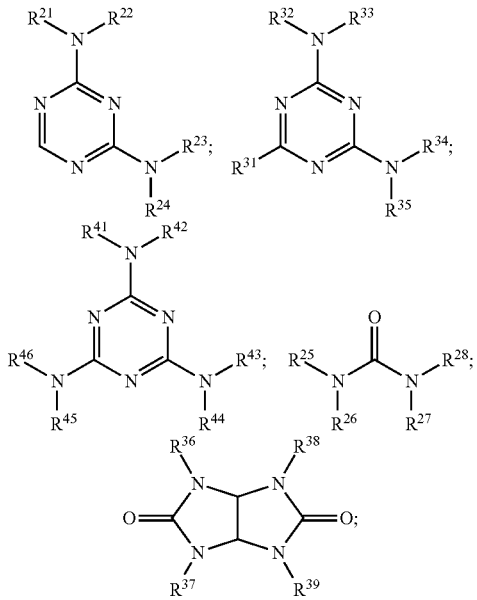

or any combination thereof;
wherein:
$R^{31}$ is a methyl group or a phenyl group; and
$R^{21}$, $R^{22}$, $R^{23}$, $R^{24}$, $R^{25}$, $R^{26}$, $R^{27}$, $R^{28}$, $R^{32}$, $R^{33}$, $R^{34}$, $R^{35}$, $R^{36}$, $R^{37}$, $R^{38}$, $R^{39}$, $R^{41}$, $R^{42}$, $R^{43}$, $R^{44}$, $R^{45}$, and $R^{46}$ independently are —H, —CH$_2$OH, or CH$_2$OR$^{14}$; wherein $R^{14}$, in each occurrence, is a C$_1$-C$_{10}$ hydrocarbyl group.

18. The coating of claim 14, wherein:
the coating has a thickness in a range from 5 to 500 μm; or
the coating has a forward or reverse impact resistance of at least 20 in-lb; or
the coating has a Persoz hardness in a range from 110 to 270 seconds; or
the coating has a mandrel bend of less than 0.75 inches; or
the coating has a MEK resistance of at least 100 double rubs; or
the coating has an acid resistance adequate to exhibit no visual damage or permanent loss of
hardness when exposed to a 5% aqueous HCl solution for 12 hours; or
any combination thereof.

19. An article of manufacture comprising a substrate at least partially covered with the coating of claim 14, wherein the substrate comprises metal, concrete, wood, paper, plastic, or combinations thereof.

20. A method of coating a substrate comprising:
a) preparing a mixture comprising:
i) an aminoplast resin composition,
ii) a polythiol composition comprising thiol molecules having an average of two or more thiol groups per molecule,
iii) an acid catalyst, and
iv) optionally, a solvent;
b) applying the mixture to a surface of the substrate; and
c) curing the mixture onto the surface of the substrate;
wherein the polythiol composition comprises:
(i) a thiol ester composition comprising thiol ester molecules derived from an unsaturated natural source oil;

(ii) a hydroxy thiol ester composition comprising hydroxy thiol ester molecules derived from an epoxidized unsaturated natural source oil;
(iii) a crosslinked thiol ester composition comprising crosslinked thiol ester oligomers having at least three thiol ester monomers derived from an unsaturated natural source oil or from an epoxidized unsaturated natural source oil, and connected by polysulfide linkages having the structure —S$_Q$—, wherein Q is an integer greater than 1; or
(iv) any combination thereof.

21. The method of claim 20, wherein the thiol ester composition comprises thiol ester molecules derived from an unsaturated natural source oil, the thiol ester molecules having:
an average of from 2.5 to 5 ester groups per thiol ester molecule,
an average of from 2 to 6 thiol groups per thiol ester molecule, and
an average of from 6 to 15 weight percent thiol sulfur per thiol ester molecule.

22. The method of claim 20, wherein the hydroxy thiol ester composition comprises hydroxy thiol ester molecules derived from an epoxidized unsaturated natural source oil, the hydroxy thiol ester molecules having:
average of from 2 to 4 ester groups per hydroxy thiol ester molecule
an average of from 2 to 6 thiol groups per hydroxy thiol ester molecule,
an average of from 2 to 5 hydroxy groups per hydroxy thiol ester molecule, and
an average of from 6 to 15 weight percent thiol sulfur per hydroxy thiol ester molecule.

23. The method of claim 20, wherein the aminoplast resin composition comprises molecules having the formula:

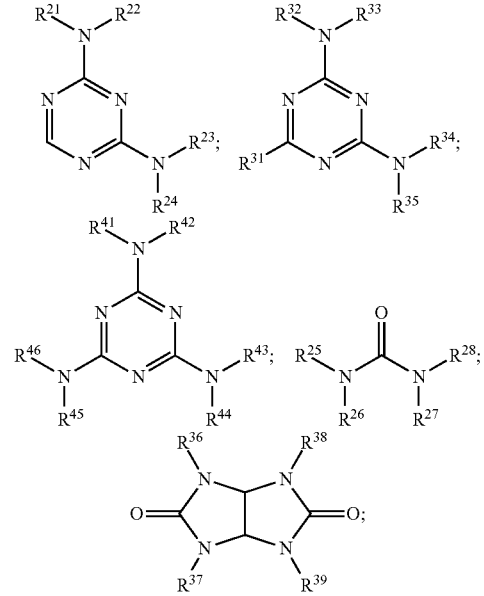

or any combination thereof
wherein:
$R^{31}$ is a methyl group or a phenyl group; and
$R^{21}$, $R^{22}$, $R^{23}$, $R^{24}$, $R^{25}$, $R^{26}$, $R^{27}$, $R^{28}$, $R^{32}$, $R^{33}$, $R^{34}$, $R^{35}$, $R^{36}$, $R^{37}$, $R^{38}$, $R^{39}$, $R^{41}$, $R^{42}$, $R^{43}$, $R^{44}$, $R^{45}$, and $R^{46}$ independently are —H, —CH$_2$OH, or CH$_2$OR$^{14}$; wherein R$^{14}$, in each occurrence, is a C$_1$-C$_{10}$ hydrocarbyl group.

24. The method of claim 20, wherein:
the acid catalyst comprises an organic sulfonic acid; and
the solvent comprises a hydrocarbon, an alcohol, a ketone, a carbonate, an ester, water, or
any combination thereof.

25. The method of claim 20, wherein the curing is conducted at a temperature in a range from 40° C. to 200° C. for a cure time in a range from 1 minute to 48 hours.

26. The aminoplast-polythiol composition of claim 1, wherein a molar ratio of ether and hydroxy groups in the aminoplast resin composition to thiol and hydroxy groups in the polythiol composition is in a range from 3:1 to 1:3.

27. The aminoplast-polythiol composition of claim 1, wherein the aminoplast-polythiol composition comprises a contact product of:
a) 10 to 50 percent by weight of the aminoplast resin composition;
b) 25 to 75 percent by weight of the polythiol composition;
c) 0.1 to 3 percent by weight of an acid catalyst; and
d) 15 to 60 percent by weight of a solvent;
wherein the weight percentages are based on the total weight of components a), b), c), and d).

28. The coating of claim 14, wherein a molar ratio of ether and hydroxy groups in the aminoplast resin composition to thiol and hydroxy groups in the polythiol composition is in a range from 3:1 to 1:3.

29. The coating of claim 14, wherein the coating comprises a cured reaction product of:
a) 10 to 50 percent by weight of the aminoplast resin composition;
b) 25 to 75 percent by weight of the polythiol composition;
c) 0.1 to 3 percent by weight of an acid catalyst; and
d) 15 to 60 percent by weight of a solvent;
wherein the weight percentages are based on the total weight of components a), b), c), and d).

30. The method of claim 20, wherein a molar ratio of ether and hydroxy groups in the aminoplast resin composition to thiol and hydroxy groups in the polythiol composition is in a range from 3:1 to 1:3.

31. The method of claim 20, wherein the mixture comprises:
i) 10 to 50 percent by weight of the aminoplast resin composition;
ii) 25 to 75 percent by weight of the polythiol composition;
iii) 0.1 to 3 percent by weight of the acid catalyst; and
iv) 15 to 60 percent by weight of the solvent;
wherein the weight percentages are based on the total weight of components i), ii), iii), and iv).

* * * * *